US012536953B2

(12) United States Patent
Lin et al.

(10) Patent No.: US 12,536,953 B2
(45) Date of Patent: Jan. 27, 2026

(54) DRIVING CIRCUIT

(71) Applicant: AUO Corporation, Hsinchu (TW)

(72) Inventors: Chih-Lung Lin, Hsinchu (TW); Yi-Chien Chen, Hsinchu (TW); Sung-Chun Chen, Hsinchu (TW); Ming-Yang Deng, Hsinchu (TW); Chia-Tien Peng, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/914,326

(22) Filed: Oct. 14, 2024

(65) Prior Publication Data

US 2025/0148963 A1 May 8, 2025

(30) Foreign Application Priority Data

Nov. 8, 2023 (TW) ................................ 112143087

(51) Int. Cl.
*G09G 3/32* (2016.01)

(52) U.S. Cl.
CPC ......... *G09G 3/32* (2013.01); *G09G 2310/061* (2013.01); *G09G 2310/08* (2013.01); *G09G 2320/064* (2013.01); *G09G 2330/021* (2013.01)

(58) Field of Classification Search
CPC ......... G09G 2310/061; G09G 2310/08; G09G 3/32; G09G 3/3233; G09G 2320/064; G09G 2330/021; G09G 2320/0626; G09G 2320/0633; H05B 45/325; H05B 45/37; H05B 45/10; H05B 45/33
See application file for complete search history.

(56) References Cited

U.S. PATENT DOCUMENTS

2024/0257723 A1* 8/2024 Kim ..................... G09G 3/3233
2025/0037659 A1* 1/2025 Xu ....................... G09G 3/3208

FOREIGN PATENT DOCUMENTS

CN 112750394 A 5/2021
TW 202416256 A 4/2024
TW 202420285 A 5/2024

* cited by examiner

*Primary Examiner* — Muhammad N Edun
(74) *Attorney, Agent, or Firm* — WPAT, PC

(57) ABSTRACT

A driving circuit includes a driving transistor, first to third capacitors and first to second switching transistors. The driving transistor is electrically connected between a first driving voltage terminal and a second driving voltage terminal, configured to control a driving current flowing through a light emitting element. The first switching transistor and the first capacitor are connected in series between a first terminal and a gate terminal of the driving transistor. A first terminal of the second capacitor is electrically connected to a gate terminal of the first switching transistor. The second switching transistor is electrically connected between a second terminal of the second capacitor and a first reference voltage terminal. The third capacitor is electrically connected between a gate terminal of the second switch transistor and a sweep signal line.

20 Claims, 13 Drawing Sheets

DRIVING CIRCUIT

CROSS-REFERENCE TO RELATED APPLICATION

This application claims priority to Taiwan Application Serial Number 112143087, filed Nov. 8, 2023, which is herein incorporated by reference in its entirety.

BACKGROUND

Field of Invention

The present invention relates to a driving circuit. More particularly, the present invention relates to a driving circuit capable for implementing grayscale dimming by pulse width modulation.

Description of Related Art

For current display technologies, multiple pixel circuits are arranged in an array on a substrate, and each pixel circuit is used to provide a driving current to a light emitting element so as to drive the light emitting element to emit light. In some cases, a pulse width of the driving current is modulated to perform grayscale dimming, thereby controlling the light emitting element to operate at a better luminous efficiency point based on a pulse amplitude of the driving current.

However, in order to implement the grayscale dimming by performing pulse width modulation, there may configure many transistor on a current path of the driving current included in the pixel circuit (for example, four or more than four transistors, where the two transistors are to control the current path of the driving current, another one is to control the pulse amplitude of the driving current, and the other one is to control the pulse width of the driving current). In these cases, in order to ensure the driving transistor can operate in a saturation region in a emission period and in consideration of a voltage across drain and source terminals of each transistor, a driving voltage required by the pixel circuit is increased, resulting in the increasing of the power consumption.

Further, the grayscale control accuracy for pulse width modulation is highly related to a transition time (such as, a rising time or a falling time) of the driving current. If the transition time of the driving current is too long, a current waveform distortion may occur at low grayscale condition, resulting in the decrease of grayscale control accuracy, and the current waveform of the driving current may not achieve the current amplitude corresponding to the high luminous efficiency point, causing the decrease in the operating efficiency of the light emitting element.

Therefore, how to provide a driving circuit to solve the above problems is an important issue in this field.

SUMMARY

The present disclosure provides a driving circuit. The driving circuit includes a driving transistor, a first capacitor, a first switching transistor, a second capacitor, a second switching transistor and a third capacitor. The driving transistor is electrically connected between a first driving voltage terminal and a second driving voltage terminal, and the driving transistor is configured to control a driving current provided to a light emitting element. A first terminal of the first capacitor is electrically connected to a gate terminal of the driving transistor. A first terminal of the first switching transistor is electrically connected to a first terminal of the driving transistor. A second terminal of the first switching transistor is electrically connected to a second terminal of the first capacitor. A first terminal of the second capacitor is electrically connected to a gate terminal of the first switching transistor. A first terminal of second switching transistor is electrically connected between a second terminal of the second capacitor and a first reference voltage terminal. A third capacitor is electrically connected between a gate terminal of the second switching transistor and a sweep signal line.

The present disclosure provides a driving circuit. The driving circuit includes a driving transistor, a first capacitor, a first switching transistor, a second capacitor, a first transistor and a second switching transistor. The driving transistor is electrically connected between a first driving voltage terminal and a second driving voltage terminal, and the driving transistor is configured to control a driving current provided to a light emitting element. The first capacitor and the first switching transistor are electrically connected in series between the first driving voltage terminal and a gate terminal of the driving transistor. The second capacitor, the first transistor and the second switching transistor are electrically connected in series between a gate terminal of the first switching transistor and a first reference voltage terminal, and a voltage at a gate terminal of the second switching transistor is varied according to a sweep signal in an emission period.

The present disclosure provides a driving circuit. The driving circuit includes a driving transistor, a first capacitor, a first switching transistor, a second capacitor, a second switching transistor and a third capacitor. The driving transistor is electrically connected between a first driving voltage terminal and a second driving voltage terminal, and the driving transistor is configured to control a driving current provided to a light emitting element. The first capacitor and the first switching transistor are electrically connected in series between the first driving voltage terminal and a gate terminal of the driving transistor. The second capacitor and the second switching transistor are electrically connected between a gate terminal of the first switching transistor and a first reference voltage terminal. Third capacitor is electrically connected between a gate terminal of the second switching transistor and a sweep signal line.

Summary, the driving circuit of the present disclosure includes a second capacitor disposed between the gate terminal of the first switching transistor and the first reference voltage terminal, thereby avoiding directly clearing a voltage at the gate terminal of the first switching transistor when the second switching transistor closes a current path within a path between the gate terminal of the first switching transistor and the first reference voltage terminal. As a result, under a condition of the first switching transistor being set up once, the setting voltage for the first switching transistor can be maintained by the second capacitor in multi-emission periods.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
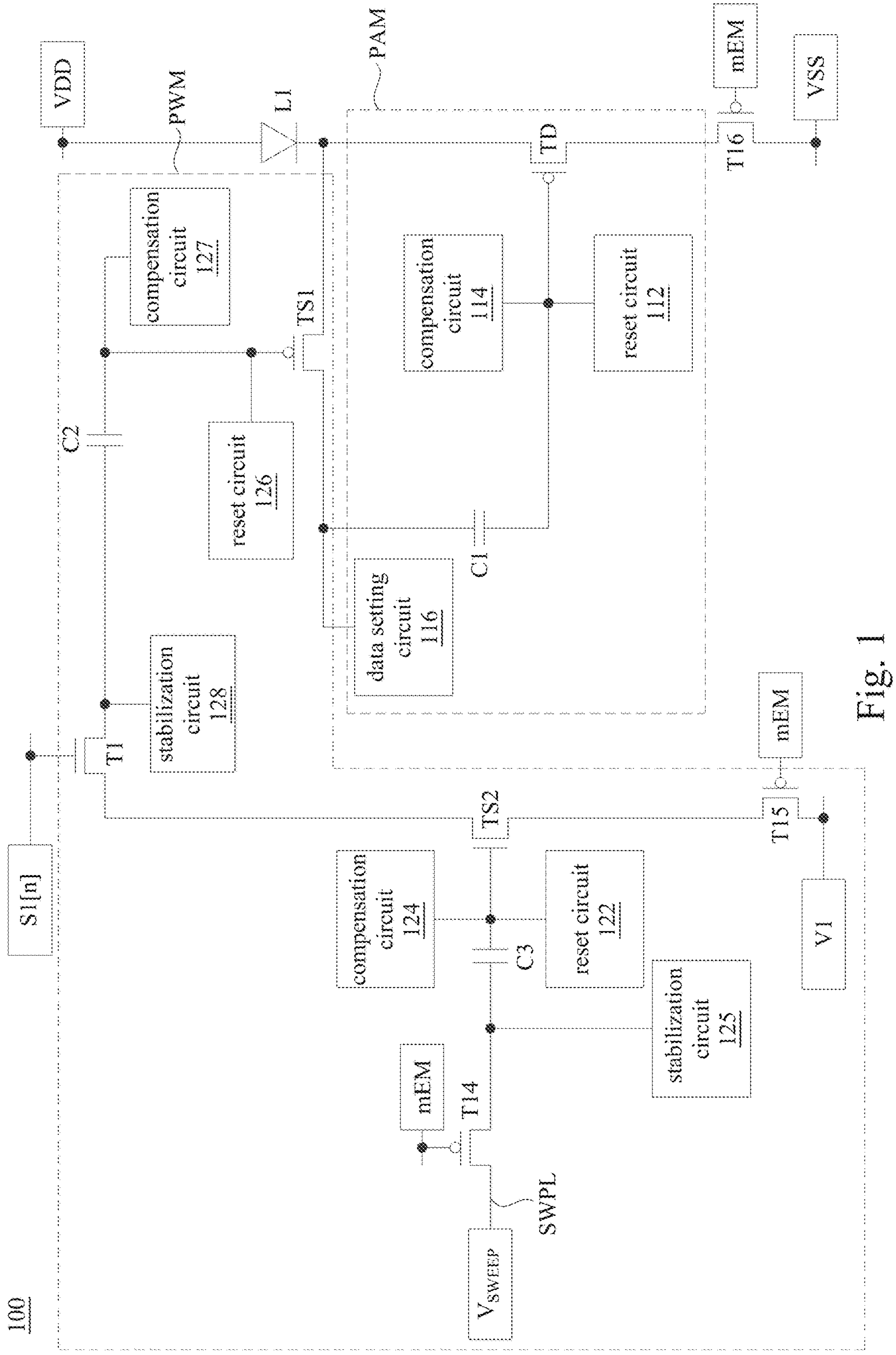
FIG. 1 depicts a schematic diagram of a driving circuit according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms “comprise” or “comprising,” “include” or “including,” “have” or “having,” “contain” or “containing” and the like used herein are to be understood to be open-ended, i.e., to mean including but not limited to.

A description is provided with reference to FIG. 1. FIG. 1 depicts a schematic diagram of a driving circuit 100 according to an embodiment of the present disclosure. In some embodiments, the driving circuit 100 is configured to control a driving current provided to a light emitting element L1. In some embodiments, the said light emitting element L1 is a micro light emitting diode (micro-LED).

As shown in FIG. 1, the driving circuit 100 includes a pulse amplitude modulation circuit PAM, a pulse width modulation circuit PWM and a transistor T16. In some embodiments, the light emitting element L1 is electrically connected to a current path of the driving current, so as to emit light according to the driving current. In some embodiments, the pulse amplitude modulation circuit PAM is electrically connected to the current path of the driving current, so as to control amplitude of the driving current. In some embodiments, the driving circuit 100 corresponding to a pixel circuit included in a red, a blue or a green sub-pixel depends on the light color of the light emitting element L1 (such as, a red, a blue or a green micro light emitting diode), and the pulse amplitude modulation circuit PAM controls the amplitude of the driving current according to the corresponding sub-pixel, as such the light emitting element L1 operates at a better efficiency point.

In some embodiments, the pulse width modulation circuit PWM is electrically connected to the pulse amplitude modulation circuit PAM, and the pulse width modulation circuit PWM is configured to control the pulse amplitude modulation circuit PAM to close a current path of the driving current. In some embodiments, the pulse width modulation circuit PWM determines a point in time that the pulse amplitude modulation circuit PAM closes the current path of the driving current in the emission period according to grayscale data. In some embodiments, the pulse width modulation circuit PWM determines a point in time that the light emitting element L1 changes from inactive to active in the emission period (first off and then on). That is, the driving circuit 100 operates the light emitting element L1 in a manner by first off and then on in the emission period.

In some embodiments, the transistor T16 is electrically connected to the current path of the driving current, and the transistor T16 is configured to turn off the current path of the driving current at the end of the emission period. In some embodiments, by adopting the first off and then on manner in the emission period, and the current path of the driving current is turned off by the transistor T16 at the end of the emission period, it is capable to effectively reduce the falling time of the driving current, thereby improving the light leakage.

Figure 2:
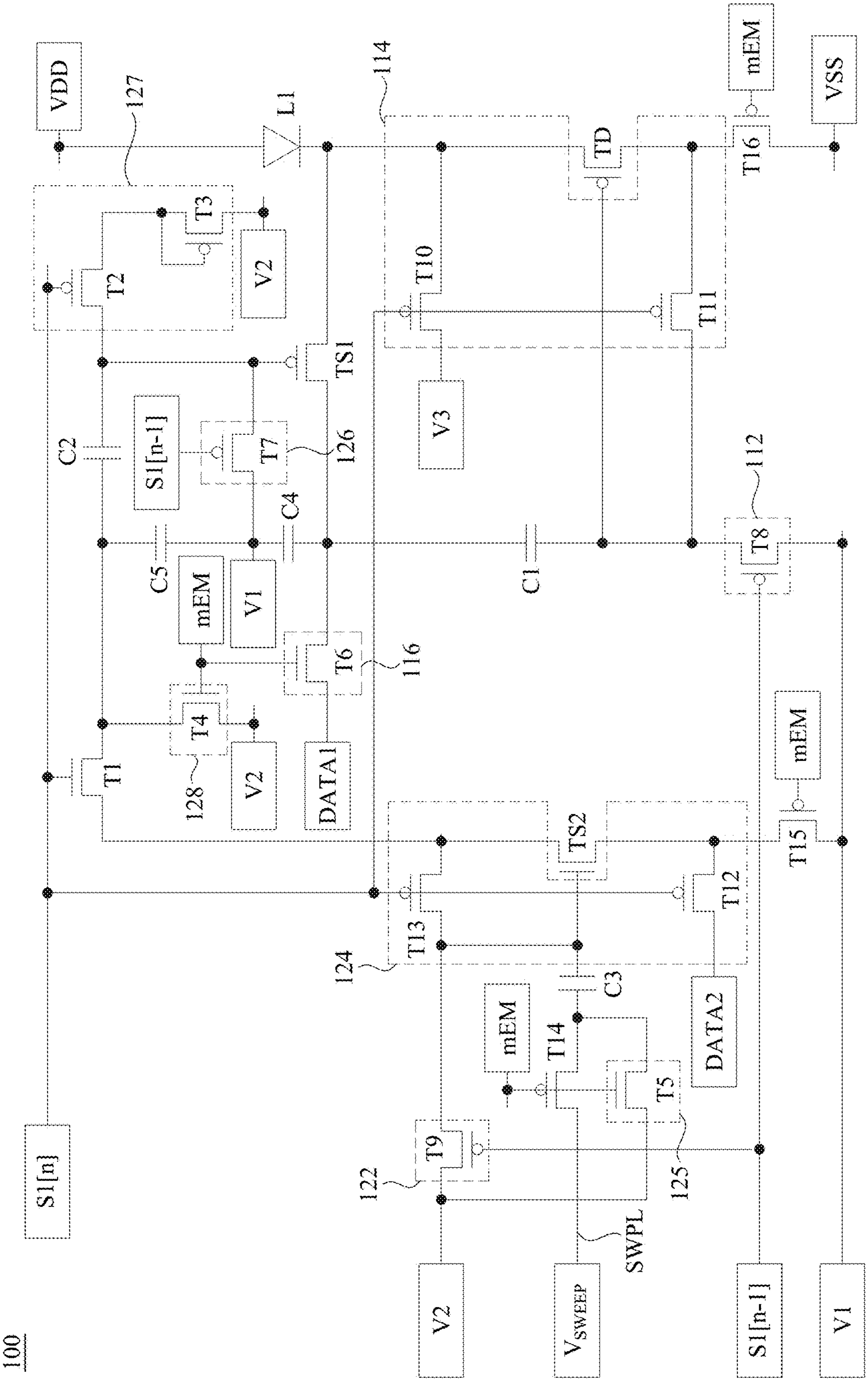
FIG. 2 depicts a schematic diagram of a driving circuit according to an embodiment of the present disclosure.

The operations of the pulse amplitude modulation circuit PAM and the pulse width modulation circuit PWM of the driving circuit 100 are described in detailed in the flowing embodiments. To better understanding, the description is provided with reference to FIG. 1 and FIG. 2.

In some embodiments, the pulse amplitude modulation circuit PAM includes a driving transistor TD, a compensation circuit 114, a reset circuit 112, a data setting circuit 116 and a capacitor C1.

In some embodiments, the driving transistor TD is electrically connected to the current path of the driving current flowing through the light emitting element L1. In some embodiments, the driving transistor TD is configured to control a point in time for closing a path through which the driving current flows, thereby modulating the pulse width of the driving current, and the driving transistor TD is further configured to control the pulse amplitude of the driving current according to the voltage at the gate terminal of the driving transistor TD.

In structure, the driving transistor TD, the light emitting element L1 and the transistor T16 are electrically connected to the current path of the driving current. In some embodiments, the driving transistor TD, the light emitting element L1 and the transistor T16 are connected in series between driving voltage terminals VDD and VSS. In some embodiments, the first terminal of the light emitting element L1 is electrically connected to the driving voltage terminal VDD, and the second terminal of the light emitting element L1 is electrically connected to the first terminal of the driving transistor TD. The second terminal of the driving transistor TD is electrically connected to the first terminal of the transistor T16. The second terminal of the transistor T16 is electrically connected to the driving voltage terminal VSS. Therefore, there are only two transistor (the driving transistor TD and the transistor T16) on the current path of the driving current in some embodiments, it can reduce a potential difference between driving voltage terminals VDD and VSS which is required to operate driving circuit 100, in order to reduce the power consumption.

In some embodiments, the reset circuit 112 is electrically connected to the gate terminal of the driving transistor TD, and the reset circuit 112 is configured to reset a voltage at the gate terminal of the driving transistor TD. In some embodiments, the reset circuit 112 includes a transistor T8. In structure, a first terminal of the transistor T8 is electrically connected to the gate terminal of the driving transistor TD, and a second terminal of the transistor T8 is electrically connected to a reference voltage terminal V1. A gate terminal of the transistor T8 is configured to receive a control signal S1[n−1]. In some embodiments, the transistor T8 closes a path through which a current flows from the gate terminal of the driving transistor TD to the reference voltage terminal V1 according to the control signal S1[n−1], thereby resetting a voltage at the gate terminal of the driving transistor TD to a voltage of the reference voltage terminal V1, as such the driving transistor TD can be turned on by the voltage of the reference voltage terminal V1.

In some embodiments, the compensation circuit 114 is electrically connected to the gate terminal of the driving transistor TD, and the compensation circuit 114 is configured to compensate a threshold voltage of the driving transistor TD. In some embodiments, the compensation circuit 114 includes transistors T10 and T11. In structure, a first terminal of the transistor T10 is electrically connected to the first terminal of the driving transistor TD, and a second terminal of the transistor T10 is electrically connected to the reference voltage terminal V3. A first terminal of the transistor T11 is electrically connected to the second terminal of the driving transistor TD, and a second terminal of the transistor T11 is electrically connected to the gate terminal of the driving transistor TD. Gate terminals of the transistor T10 and the transistor T11 are configured to receive a control signal S1[n]. In some embodiments, the transistor T10 and T11 are configured to be turned on according to the control signal S1[n], thereby transmitting a voltage of the reference voltage terminal V3 through the transistor T10, the driving transistor TD and the transistor T11 to the gate terminal of the driving transistor TD, until the driving transistor TD is cut-off, in order to compensate the threshold voltage of the driving transistor TD.

In some embodiments, the first terminal of the capacitor C1 is electrically connected to the gate terminal of the driving transistor TD, and a second terminal of the capacitor C1 is electrically connected to the data setting circuit 116. In some embodiments, a second terminal of the capacitor C1 is configured to store a data voltage of a data signal DATA1 transmitted by the data setting circuit 116. In some embodiments, the capacitor C1 is configured to transmit a voltage variation at the second terminal of the capacitor C1 to the gate terminal of the driving transistor TD by capacitive coupling effect, the said voltage variation includes a factor of the data voltage of the data signal DATA1.

In some embodiments, the data setting circuit 116 includes a transistor T6. In structure, a first terminal of the transistor T6 is electrically connected to the second terminal of the capacitor C1, and a second terminal of the transistor T6 is configured to receive a data signal DATA1. A gate terminal of the transistor T6 is configured to receive a multi-emission control signal mEM. In some embodiments, the transistor T6 is configured to close a path through which a current flows from the a line of the data signal DATA1 to the second terminal of the capacitor C1, thereby transmitting the data voltage of the data signal DATA1 to the second terminal of the capacitor C1, in order to perform the data setting.

In some embodiments, the capacitor C4 is electrically connected between the second terminal of the capacitor C1 and the reference voltage terminal V1. In some embodiments, a first terminal of the capacitor C4 is electrically connected to the second terminal of the capacitor C1, and a second terminal of the capacitor C4 is electrically connected to the reference voltage terminal V1. In some embodiments, the capacitor C4 is configured to stabilize a voltage of the capacitor C1.

In some embodiments, the pulse width modulation circuit PWM includes switching transistors TS1 and TS2, capacitors C2~C5, transistors T1~T7, T9 and T12~T15, reset circuits 122 and 126, compensation circuits 124 and 127, and stabilization circuits 125 and 128.

In some embodiments, the switching transistor TS1 is electrically connected between the driving voltage terminal VDD and the second terminal of the capacitor C1. In some embodiments, a first terminal of the switching transistor TS1 is electrically connected through the light emitting element L1 to the driving voltage terminal VDD, and a second terminal of the switching transistor TS1 is electrically connected through the capacitor C1 to the gate terminal of the driving transistor TD. In some embodiments, the first terminal of the switching transistor TS1 is electrically connected to the second terminal of the light emitting element L1, and the second terminal of the switching transistor TS1 is electrically connected to the second terminal of the capacitor C1. In some embodiments, the switching transistor TS1 is configured to close a path through which a current flows from the driving voltage terminal VDD to the second terminal of the capacitor C1 according to a voltage at the gate terminal of the switching transistor TS1, in order to change the voltage at the second terminal of the capacitor C1, as such the capacitor C1 change a voltage at the gate terminal of the driving transistor TD according to the voltage variation at the second terminal of the capacitor C1, where the said voltage variation includes a factor of the data voltage of the data signal DATA1, thereby determining a conduction level, so as to control an amplitude of the driving current flowing through the light emitting element L1.

In some embodiments, the reset circuit 126 is electrically connected to the gate terminal of the switching transistor TS1, and the reset circuit 126 is configured to reset a voltage at the gate terminal of the switching transistor TS1. In some embodiments, the reset circuit 126 includes a transistor T7. In some embodiments, a first terminal of the transistor T7 is electrically connected to a gate terminal of the switching transistor TS1, and a second terminal of the transistor T7 is electrically connected to the reference voltage terminal V1. A gate terminal of the transistor T7 is configured to receive a control signal S1[n−1]. In some embodiments, the transistor T7 is turned on according to the control signal S1[n−1], thereby transmitting the voltage of the reference voltage terminal V1 to the gate terminal of the switching transistor TS1, in order to perform the reset operation on the switching transistor TS1.

In some embodiments, the compensation circuit 127 is electrically connected to the gate terminal of the switching transistor TS1, and the compensation circuit 127 is configured to perform matching compensation on a threshold voltage of the switching transistor TS1. In some embodiments, the compensation circuit 124 includes a transistor T2 and a transistor T3. In some embodiments, a second terminal of the transistor T3 is electrically connected to the reference voltage terminal V2, and a first terminal and a gate terminal of the transistor T3 are electrically connected to a second terminal of the transistor T2. In some embodiments, a first terminal of the transistor T2 is electrically connected to a gate terminal of the switching transistor TS1, and a second terminal of the transistor T2 is electrically connected to a first terminal of the transistor T3. A gate terminal of the transistor T2 is configured to receive a control signal S1[n]. In some embodiments, the transistor T2 is configured to close a path through which a current flows from the first terminal of transistor T3 to the first terminal of the capacitor C2 according to the control signal S1[n]. In some embodiments, when the transistor T2 is turned on, a reset voltage stored in the first terminal of the capacitor C2 is transmitted through the transistor T2 to the gate terminal of the transistor T3, in order to turn on the transistor T3. When the transistor T3 is turned on, the voltage of the reference voltage terminal V2 is transmitted through the transistor T3 to the gate terminal of the transistor T3, and the voltage of the reference voltage terminal V2 is transmitted through the transistors T3 and T2 to the first terminal of the capacitor C2, until the transistor T3 is cut-off. Meanwhile, a voltage at the first terminal of the capacitor C2 (that is, a voltage at the gate terminal of the switching transistor TS1) includes a factor of the threshold voltage of the transistor T3, thereby performing the matching compensation to threshold voltage of the switching transistor TS1 by the transistor T3.

In some embodiments, a first terminal of the capacitor C2 is electrically connected to the gate terminal of the switching transistor TS1, and a second terminal of the capacitor C2 is electrically connected through the transistor T1 and the switching transistor TS2 to the reference voltage terminal V1. In some embodiments, the switching transistor TS1 is configured to close a path through which a current flows from the driving voltage terminal VDD to the second terminal of the capacitor C1 according to a voltage at the first terminal of the capacitor C2, as such the capacitor C1 changes a voltage at the gate terminal of the driving transistor TD by capacitive coupling effect, in order to turn on the driving transistor TD. In some embodiments, by disposing the capacitor C2 between the gate terminal of the switching transistor TS1 and the first terminal of the switching transistor TS2, the matching compensation factor can be avoid being cleared by the reference voltage terminal V1 after one emission operation, thereby remaining the compensation factor for the switching transistor TS1 in each of emission periods after one compensation operation.

In some embodiments, the stabilization circuit 128 is electrically connected to the second terminal of the capacitor C2, and the stabilization circuit 128 is configured to stabilize a voltage at the second terminal of the capacitor C2. In some embodiments, the stabilization circuit 128 includes a transistor T4. In some embodiments, a first terminal of the transistor T4 is electrically connected to the second terminal of the capacitor C2, and a second terminal of the transistor T4 is electrically connected to the reference voltage terminal V2. A gate terminal of the transistor T4 is configured to receive a multi-emission control signal mEM. In some embodiments, the transistor T4 is configured to a path through which a current flows from the reference voltage terminal V2 to the second terminal of the capacitor C2.

In some embodiments, the capacitor C5 is electrically connected between the second terminal of the capacitor C2 and the reference voltage terminal V1. In some embodiments, the first terminal of the capacitor C5 is electrically connected to the second terminal of the capacitor C2, and the second terminal of the capacitor C5 is electrically connected to the reference voltage terminal V1. In some embodiments, the capacitor C5 is configured to stabilize a voltage of the capacitor C2.

In some embodiments, the transistor T1 is electrically connected between the second terminal of the capacitor C2 and the first terminal of the switching transistor TS2. In some embodiments, the first terminal of the transistor T1 is electrically connected to the second terminal of the capacitor C2, a second terminal of the transistor T1 is electrically connected to the first terminal of the switching transistor TS2. A gate terminal of the transistor T1 is configured to receive the control signal S1[n]. In some embodiments, the transistor T1 electrically isolates the capacitor C2 from the switching transistor TS2 according to the control signal S1[n] in a compensation period, in order to avoid that the coupling effect of the capacitor C2 to affect the matching compensation of the switching transistor TS1.

In some embodiments, the switching transistor TS2 is electrically connected to a current path between the reference voltage terminal V1 and the capacitor C2, so as to close a current path between the reference voltage terminal V1 and the capacitor C2 according to a voltage at the gate terminal of the switching transistor TS2, and a voltage variation at the second terminal of the capacitor C2 changes a voltage at the gate terminal of the switching transistor TS1 by capacitive coupling effect, thereby turning on the switching transistor TS1.

In some embodiments, the reset circuit 122 is electrically connected to the gate terminal of the switching transistor TS2, and the reset circuit 122 is configured to reset a voltage at the gate terminal of the switching transistor TS2. In some embodiments, the reset circuit 122 includes a transistor T9. In some embodiments, a first terminal of the transistor T9 is electrically connected to the gate terminal of the switching transistor TS2, and the second terminal of the transistor T9 is electrically connected to the reference voltage terminal V2. A gate terminal of the transistor T9 receives the control signal S1[n−1]. In some embodiments, the transistor T9 is configured to close a path through which a current flows from the reference voltage terminal V2 to the gate terminal of the switching transistor TS2 according to the control signal S1[n−1], thereby performing the reset operation for the switching transistor TS2.

In some embodiments, the compensation circuit 124 is electrically connected to the gate terminal of the switching transistor TS2, and the compensation circuit 124 is configured to compensate a threshold voltage of the switching transistor TS2. In some embodiments, the compensation circuit 124 includes transistors T12 and T13. In some embodiments, a first terminal of the transistor T12 is electrically connected to the second terminal of the switching transistor TS2, and the second terminal of the transistor T12 is configured to receive a data signal DATA2. A gate terminal of the transistor T12 is configured to receive the control signal S1[n]. In some embodiments, the first terminal of the transistor T13 is electrically connected to the first terminal of the switching transistor TS2, and a second terminal of the transistor T13 is electrically connected to the gate terminal of the switching transistor TS2. A gate terminal of the transistor T13 is configured to receive the control signal S1[n]. In some embodiments, the transistors T12 and T13 are turned on according to the control signal S1[n], in order to transmit a data voltage of the data signal DATA2 through the transistor T12, the switching transistor TS2 and the transistor T13 to the gate terminal of the switching transistor TS2, until the switching transistor TS2 is cut-off, thereby compensating the threshold voltage of the switching transistor TS2.

In some embodiments, the capacitor C3 is electrically between the gate terminal of the switching transistor TS2 and the sweep signal line SWPL. In some embodiments, a first terminal of the capacitor C3 is electrically connected to the gate terminal of the switching transistor TS2, and a first terminal of the capacitor C3 is electrically connected through the transistor T14 to the sweep signal line SWPL. In some embodiments, the sweep signal line SWPL is configured to transmit the sweep signal $V_{SWEEP}$. In some embodiments, a voltage of the sweep signal $V_{SWEEP}$ is linearly increased in the emission period. In some embodiments, the switching transistor TS2 is configured to close a path through which a current flow from the second terminal of the capacitor C2 to the reference voltage terminal V1 according to the sweep signal $V_{SWEEP}$ of the sweep signal line SWPL, in order to change a voltage at the gate terminal of the switching transistor TS1 by capacitive coupling effect of the capacitor C2, thereby turning on the switching transistor TS1.

In some embodiments, the stabilization circuit 125 is electrically connected to a second terminal of the capacitor C3, and the stabilization circuit 125 is configured to stabilize a voltage at the second terminal of the capacitor C3. In some embodiments, the stabilization circuit 125 includes a transistor T5. In some embodiments, a first terminal of the transistor T5 is electrically connected to a second terminal of the capacitor C3, and a second terminal of the transistor T5 is electrically connected to the reference voltage terminal V2. A gate terminal of the transistor T5 is configured to receive a multi-emission control signal mEM. In some embodiments, the transistor T5 is turned on according to the multi-emission control signal mEM. In some embodiments, the transistor T5 is turned on according to the multi-emission control signal mEM, in order to transmit the voltage of the reference voltage terminal V2 to the second terminal of the capacitor C3, thereby stabilizing a voltage at the second terminal of the capacitor C3.

In some embodiments, a first terminal of the transistor T14 is electrically connected to the second terminal of the capacitor C3, and a second terminal of the transistor T14 is electrically connected to the sweep signal line SWPL. A gate terminal of the transistor T14 is configured to receive the multi-emission control signal mEM. In some embodiments, the transistor T14 is configured to electrically isolate the second terminal of the capacitor C3 from the sweep signal line SWPL in the periods except the emission periods according to the multi-emission control signal mEM, in order to avoid the effect of the coupling effect of the capacitor C3 on the waveform of the sweep signal VSWEEP.

In some embodiments, a first terminal of the transistor T15 is electrically connected to the second terminal of the switching transistor TS2, and a second terminal of the transistor T15 is electrically connected to the reference voltage terminal V1. A gate terminal of the transistor T15 is configured to receive the multi-emission control signal mEM. In some embodiments, the transistor T15 is configured to close a path through which a current flows from the second terminal of the switching transistor TS2 to the reference voltage terminal V1 according to the multi-emission control signal mEM.

In some embodiments, each of the aforesaid transistors includes a first terminal, a second terminal and a gate terminal. If a first terminal of a transistor is a drain/source terminal, a second terminal of the transistor is a source/drain terminal. In addition, each of the aforesaid capacitors includes a first terminal and a second terminal. If a first terminal of a capacitor is anode/cathode, a second terminal of the capacitor is cathode/anode.

Figure 3:
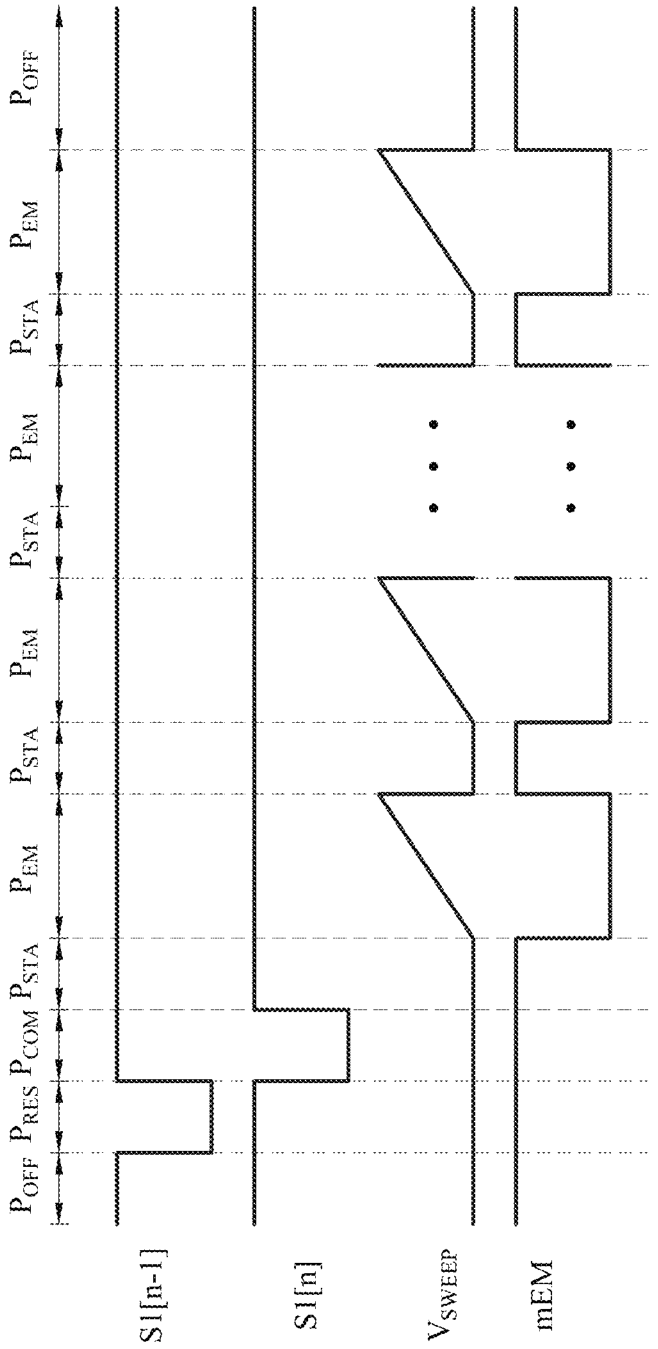
FIG. 3 depicts a timing diagram of control signals according to an embodiment of the present disclosure.

A description is provided with reference to FIG. 3. FIG. 3 depicts a timing diagram of control signals according to an embodiment of the present disclosure. As shown in FIG. 3, a display cycle in control timing of the driving circuit 100 can be divided into five types of period, which are a reset period PRES, a compensation period $P_{COM}$, multiple stabilization periods $P_{STA}$, multiple emission periods $P_{EM}$. The two adjacent emission periods $P_{EM}$ are separated from each other by a stabilization period $P_{STA}$. In some embodiments, a time length of each of the reset period PRES and the compensation period $P_{COM}$ is a horizontal scan time. In some embodiments, a time length of the emission period $P_{EM}$ is two horizontal scan time. To be noted that, time lengths of these period in FIG. 3 are for illustration, it is not intended to limit the present disclosure.

Figure 4A:
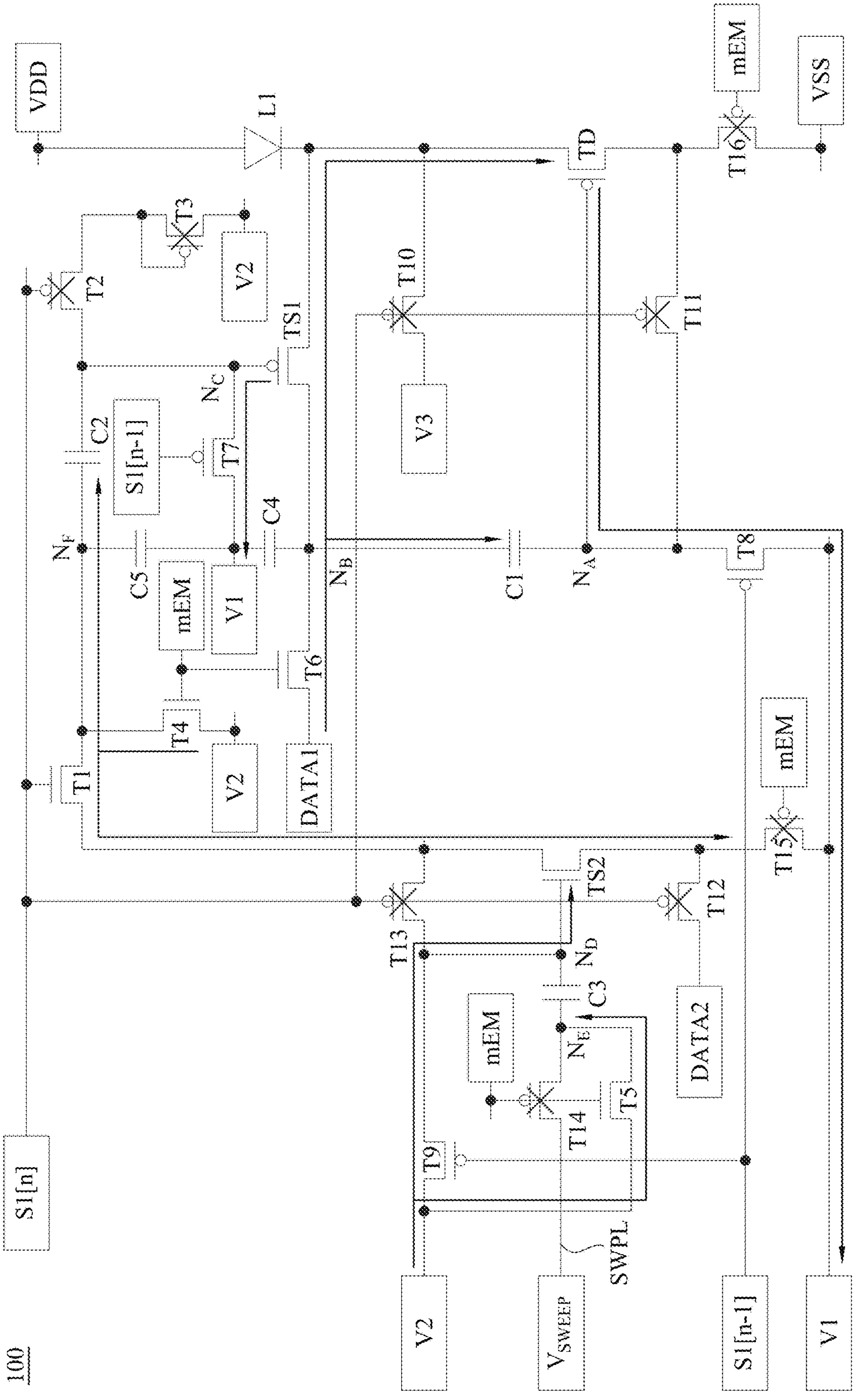
FIG. 4A depicts a schematic diagram of an operation of a driving circuit in a reset period according to an embodiment of the present disclosure.
Figure 4B:
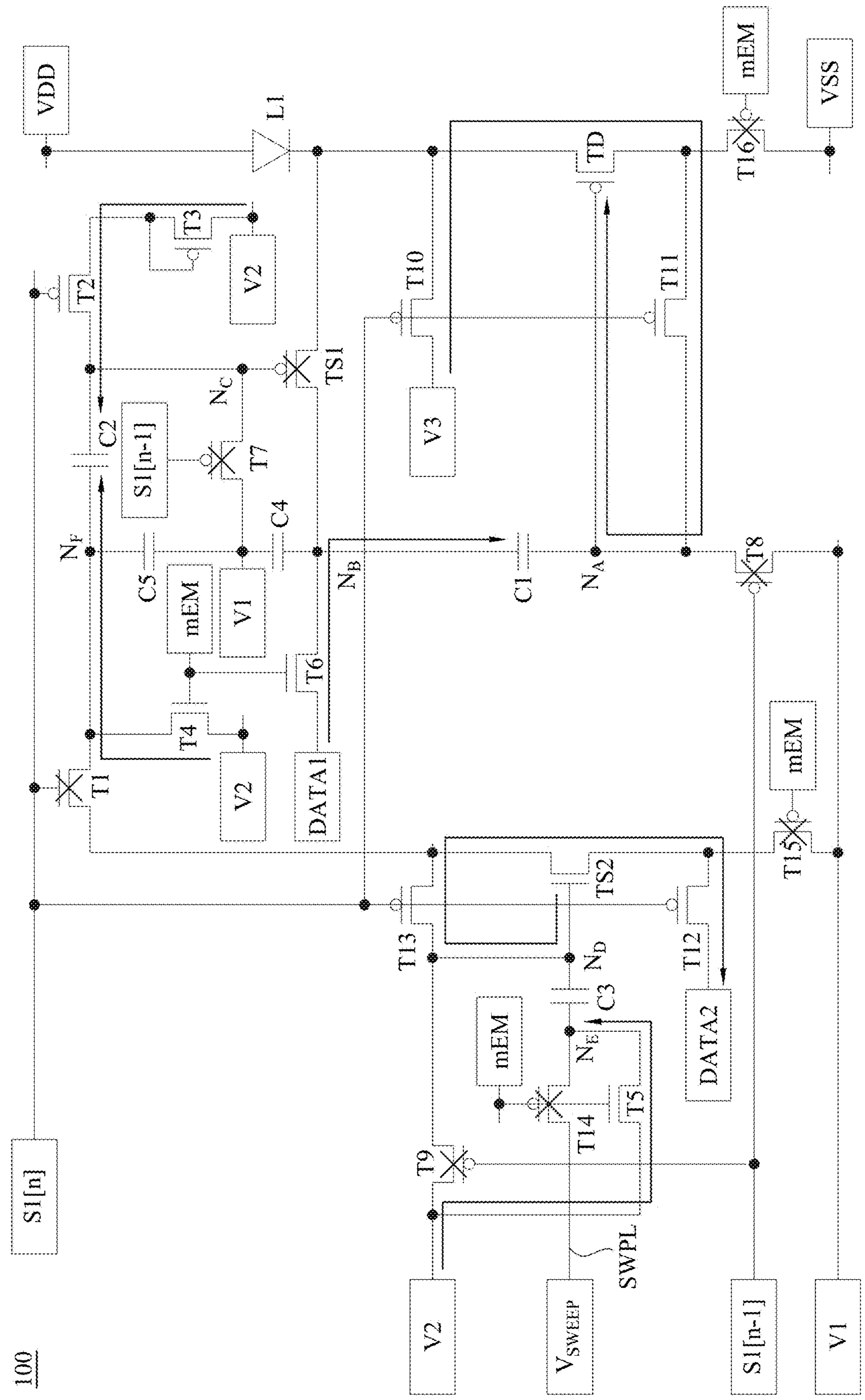
FIG. 4B depicts a schematic diagram of an operation of a driving circuit in a compensation period according to an embodiment of the present disclosure.
Figure 4C:
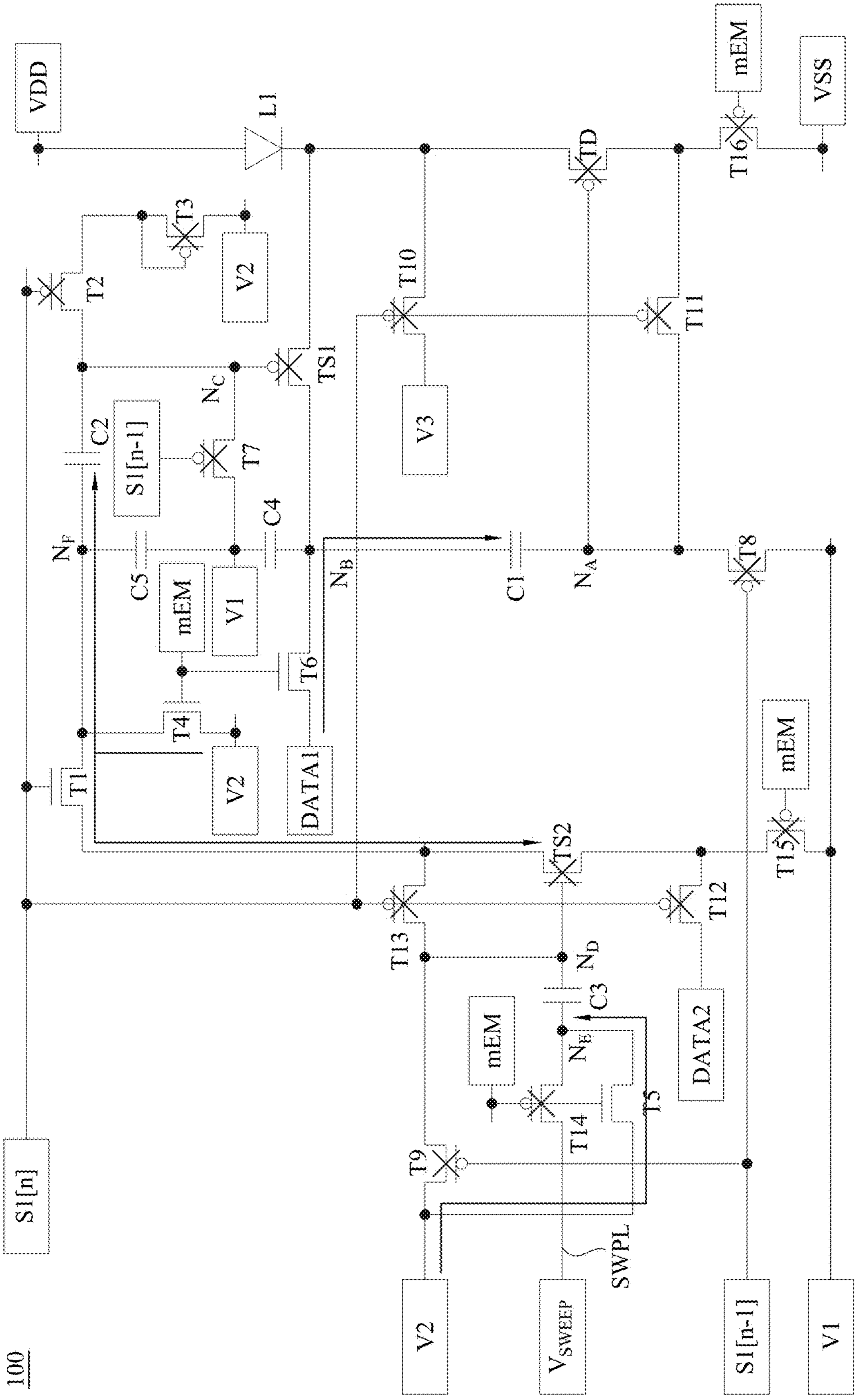
FIG. 4C depicts a schematic diagram of an operation of a driving circuit in a first stabilization period included in a display cycle according to an embodiment of the present disclosure.
Figure 4D:
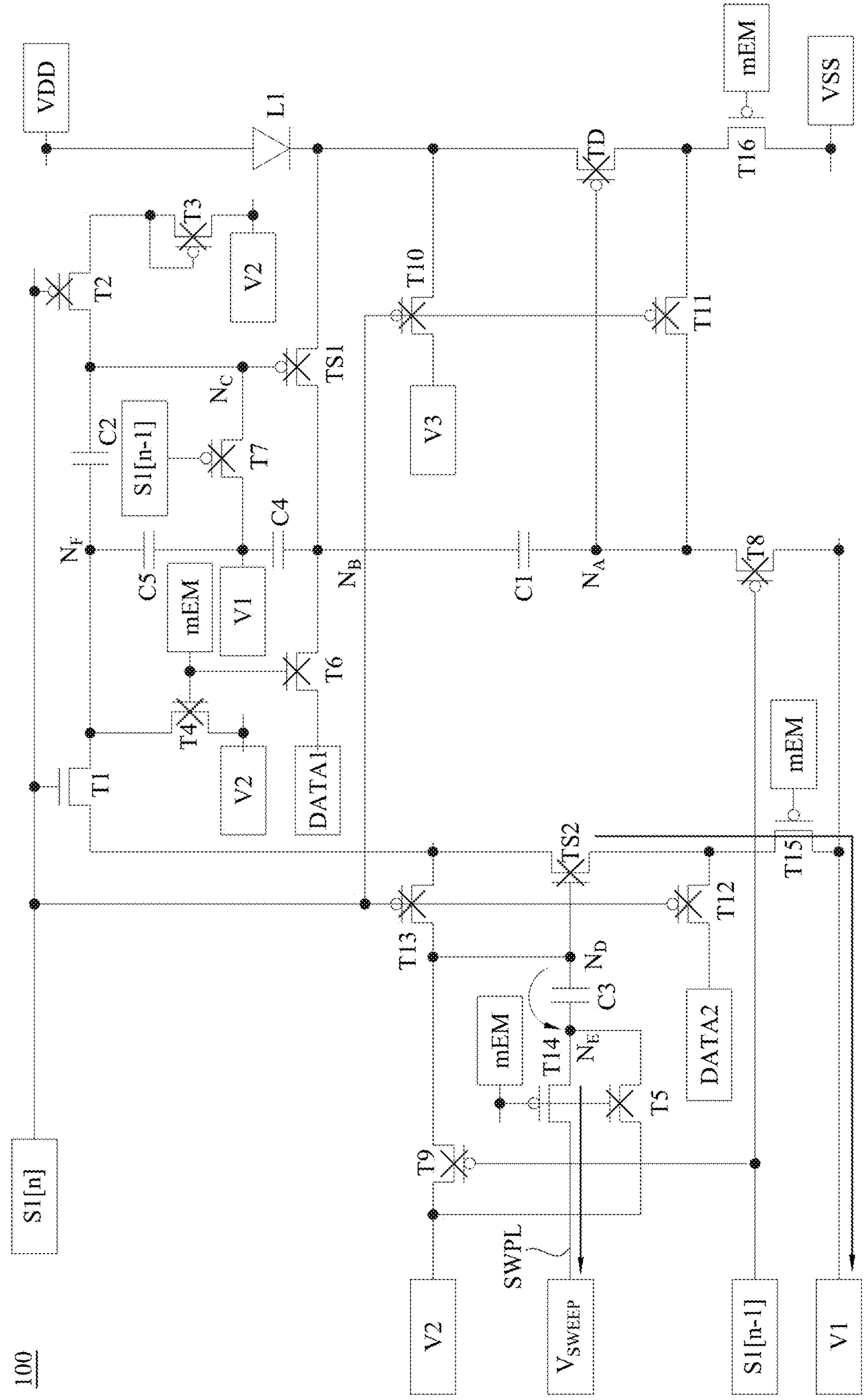
FIG. 4D and FIG. 4E depict schematic diagrams of operations of a driving circuit in an emission period according to an embodiment of the present disclosure.
Figure 4E:
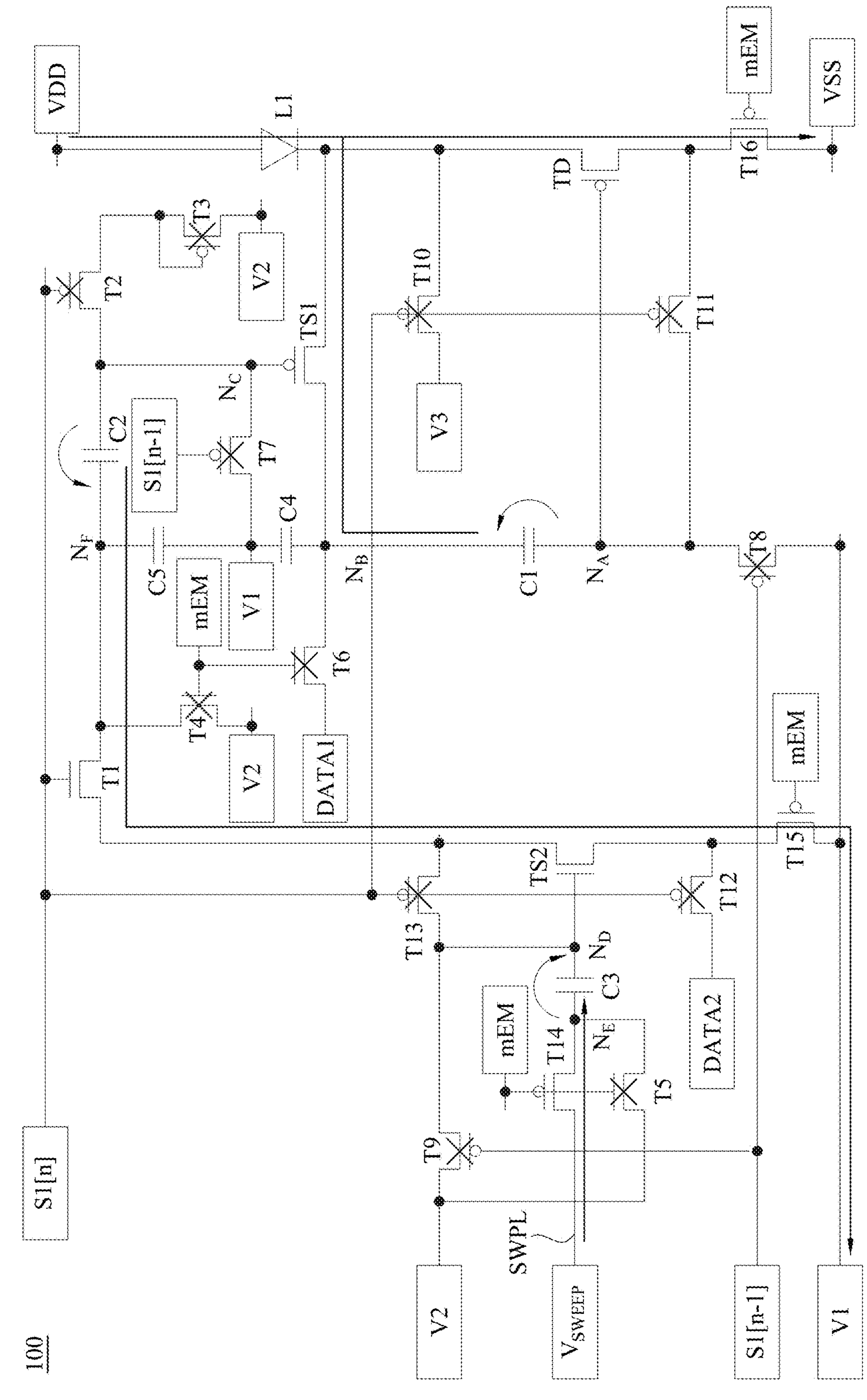
Figure 4F:
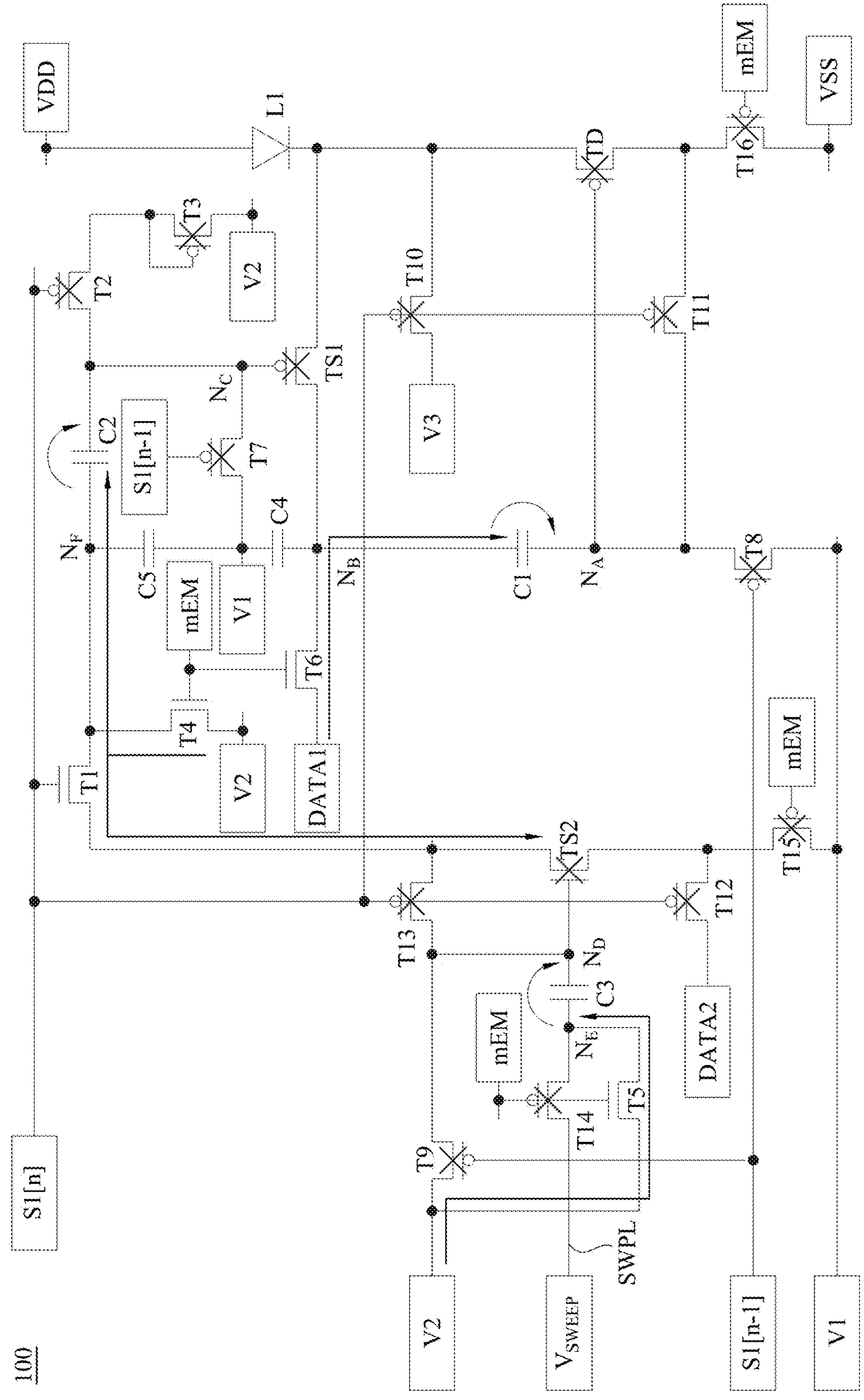
FIG. 4F depicts a schematic diagram of an operation of a driving circuit in a second and the following stabilization periods and an off period included in a display cycle according to an embodiment of the present disclosure.

For better understanding for the overall operation of the driving circuit 100, a description is provided with reference to FIG. 2, FIG. 3 and FIG. 4A to FIG. 4F. FIG. 4A depicts a schematic diagram of an operation of a driving circuit 100 in a reset period PRES according to an embodiment of the present disclosure. FIG. 4B depicts a schematic diagram of an operation of a driving circuit 100 in a compensation period $P_{COM}$ according to an embodiment of the present disclosure. FIG. 4C depicts a schematic diagram of an operation of a driving circuit 100 in a first stabilization period $P_{STA}$ included in a display cycle according to an embodiment of the present disclosure. FIG. 4D and FIG. 4E depict schematic diagrams of operations of a driving circuit 100 in an emission period $P_{EM}$ according to an embodiment of the present disclosure. FIG. 4F depicts a schematic diagram of an operation of a driving circuit 100 in an off period $P_{OFF}$ included in a display cycle according to an embodiment of the present disclosure.

As shown in FIG. 3, the control signal S1[n−1] in the reset period PRES has a first logic level (such as, a low logic level); and the control signal S1[n−1] in the compensation period $P_{COM}$, the stabilization period $P_{STA}$, the emission period $P_{EM}$ and the off period $P_{OFF}$ has a second logic level (such as, a high logic level).

In some embodiments, the control signal S1[n] in the compensation period $P_{COM}$ has the low logic level; and the control signal S1[n] in the reset period PRES, the stabilization period $P_{STA}$, the emission period $P_{EM}$ and the off period $P_{OFF}$ has the high logic level.

In some embodiments, the multi-emission control signal mEM in the emission period $P_{EM}$ has the low logic level; and the multi-emission control signal mEM in the reset period PRES, the compensation period $P_{COM}$, the stabilization period $P_{STA}$ and the off period $P_{OFF}$ has the high logic level.

In some embodiments, a voltage of the sweep signal $V_{SWEEP}$ in the reset period PRES, the compensation period $P_{COM}$, the stabilization period $P_{STA}$ and the off period $P_{OFF}$ is at an initial voltage; and a voltage of the sweep signal $V_{SWEEP}$ is linearly increased in the emission period $P_{EM}$, and returns to the initial voltage at the stabilization period $P_{STA}$.

To be noted that, in the embodiments of FIG. 2, FIG. 3, FIG. 4A to FIG. 4F, each of the said transistors T1 and T4~T6 and the switching transistor TS2 are N-type transistor, and the said transistors T2~T3 and T7~T16, the driving transistor TD and the switching transistor TS1 are P-type transistor. In other embodiments, the said transistors T1 and T4~T6 and the switching transistor TS2 can be implemented by P-type transistor, and the transistors T2~T3 and T7~T16, the driving transistor TD and the switching transistor TS1 can be implemented by N-type transistor. In this case, the logic levels of the control signals S1[n−1] and S1[n], the sweep signal $V_{SWEEP}$ and the multi-emission control signal mEM in the embodiments of FIG. 3 can be accordingly adjusted to achieve the functions the same as or similar with the present disclosure. Therefore, it is not intended to limit the present disclosure.

As shown in FIG. 4A, in the reset period PRES, the control signal S1[n−1] at a first logic level (such as, a low logic level) is applied to the gate terminals of the transistor T7~T9, in order to close paths through which currents flow from the gate terminal of the driving transistor TD and the gate terminal of the switching transistor TS1 to the reference voltage terminal V1, and to close a path through which a current flows from the reference voltage terminal V2 to the gate terminal of the switching transistor TS2, thereby resetting voltages at the gate terminals of the switching transistors TS1~TS2 and the driving transistor TD.

In some embodiments, in the reset period PRES, the multi-emission control signal mEM at a second logic level (such as, a high logic level) is applied to the gate terminal of the transistor T5, in order to close a path through a current flows from the reference voltage terminal V2 to the second terminal of the capacitor C3, thereby stabilizing a voltage at the second terminal of the capacitor C3.

In some embodiments, in the reset period PRES, the multi-emission control signal mEM at the high logic level is applied to the gate terminal of the transistor T6 to turn on the transistor T6, as such a data voltage of the data signal DATA1 is transmitted through the transistor T6 to the second terminal of the capacitor C1, thereby stabilizing a voltage at the second terminal of the capacitor C1. In addition, the data voltage of the data signal DATA1 is transmitted through the transistor T6 and the switching transistor TS1 to the first terminal of the driving transistor TD, thereby stabilizing a voltage at the first terminal of the driving transistor TD.

In some embodiments, in the reset period PRES, the multi-emission control signal mEM at the high logic level is applied to the gate terminal of the transistor T4, as such the transistor T4 is turned on, in order to close a path through which a current flows from the reference voltage terminal V2 to the capacitor C2 and the switching transistor TS2, thereby stabilizing voltages at the second terminal of the capacitor C2 and the second terminal of the switching transistor TS2.

In the reset period PRES, the control signal S1[n] at the high logic level is applied to the gate terminals of the transistors T2 and T10~T13, so as to turn off the transistors T2 and T10~T13. And, the multi-emission control signal mEM at the high logic level is applied to the transistor T14~T16, in order to turn off the transistors T14~T16.

In some embodiments, sort the voltages at the voltage terminals and the signal terminals of the driving circuit 100 in descending order as follows: the voltage of the reference voltage terminal V2, the voltage of the reference voltage terminal V3, the voltage of the driving voltage terminal VDD and the voltage of the reference voltage terminal V1. That is, the voltages of the reference voltage terminals V2 and V3 are greater than the voltage of the driving voltage terminal VDD, and the voltage of the reference voltage terminal V1 is less than the voltage of the driving voltage terminal VDD. In some embodiments, the data voltage of the data signal DATA2 is less than the voltage of the reference voltage terminal V2.

In the reset period PRES, voltages at a node $N_A$ (a connection between the gate terminal of the driving transistor TD and the first terminal of the capacitor C1) and a node $N_C$ (a connection between the gate terminal of the switching transistor TS1 and the first terminal of the capacitor C2) are substantially equal to the voltage of the reference voltage terminal V1. A voltage at a node $N_B$ (a connection between the second terminal of the capacitor C1 and the first terminal of the transistor T6) is substantially equal to the data voltage of the data signal DATA1. Voltages at a node $N_D$ (a connection between the gate terminal of the switching transistor TS2 and the first terminal of the capacitor), a node $N_E$ (a connection between the second terminal of the capacitor C3 and the first terminal of the transistor T5) and a node $N_F$ (a connection between the second terminal of (the capacitor C2 and the first terminal of the transistor T1) are substantially equal to the voltage of the reference voltage terminal V2.

As shown in FIG. 4B, in the compensation period $P_{COM}$, the control signal S1[n] at the low logic level is applied to the gate terminals of the transistors T10~T11 to turn on the transistors T10~T11, as such the voltage of the reference voltage terminal V3 is transmitted through the transistor T10, the driving transistor TD and the transistor T11 to the gate terminal of the driving transistor TD, until the driving transistor TD is cut-off, thereby compensating the threshold voltage of the driving transistor TD.

In the compensation period $P_{COM}$, the control signal S1[n] at the low logic level is applied to the gate terminals of the transistors T12~T13 to turn on the transistors T12~T13, as such the reset voltage (such as, the voltage of the reference voltage terminal V2) at the first terminal of the capacitor C3 is pulled down by the data voltage of the data signal DATA2 through the transistor T13, the switching transistor TS2 and the transistor T12, until the switching transistor TS2 is cut-off. Meanwhile, the voltage at the gate terminal of the switching transistor TS2 is substantially equal to a sum of the data voltage of the data signal DATA2 and the threshold voltage of the switching transistor TS2. As a result, a voltage at the gate terminal of the switching transistor TS2 includes the factor of the threshold voltage of the switching transistor TS2. In some embodiments, the voltage of reference voltage terminal V2 is greater than the data voltage of the data signal DATA2.

In some embodiments, in the compensation period $P_{COM}$, the control signal S1[n] at the low logic level is applied to the gate terminal of the transistor T2 to turn on the transistor T2, as such a reset voltage stored in the first terminal of the capacitor C2 is transmitted through the transistor T2 to the gate terminal of the transistor T3, thereby turning on the transistor T3. When the transistor T3 is turned on, the voltage of the reference voltage terminal V2 is transmitted through the transistor T3 to the first terminal of the capacitor C2 and the gate terminal of the transistor T3, until the transistor T3 is cut-off. As a result, a voltage at the node $N_C$ is substantially equal to a difference between an absolute value of the threshold voltage of the transistor T3 and the voltage of the reference voltage terminal V2. Therefore, the compensation circuit 127 performs the matching compensation to the threshold voltage of the switching transistor TS1.

In some embodiments, in the compensation period $P_{COM}$, the multi-emission control signal mEM at the high logic level is applied to the gate terminals of the transistors T4~T5 to turn on the transistors T4~T5, thereby stabilizing the voltages at the second terminals of the capacitors C2~C3. In some embodiments, in the compensation period $P_{COM}$, the multi-emission control signal mEM at the high logic level is applied to the gate terminal of the transistor T6 to turn on the transistor T6, thereby stabilizing the voltage at the second terminal of the capacitor C1.

In the compensation period $P_{COM}$, a voltage at the node $N_B$ is substantially equal to the data voltage of the data signal DATA1. Voltages at the node $N_E$ and $N_F$ are substantially equal to the voltage of the reference voltage terminal V2. The voltages at the node $N_A$, node $N_C$ and node $N_D$ are given by the following functions.

$$V_{NA} = V3 - |V_{TH\_TD}|$$

$$V_{NC} = V2 - |V_{TH\_T3}|$$

$$V_{ND} = V_{DATA2} + V_{TH\_TS2}$$

In above functions, the term "$V_{NA}$" refers to the voltage at the node $N_A$. The term "$|V_{TH\_TD}|$" refers to an absolute value of the threshold voltage of the driving transistor TD. $V_{NC}$ refers to the voltage at the node $N_C$. The term "$|V_{TH\_T3}|$" refers to an absolute value of the threshold voltage of the transistor T3. The term "$V_{DATA2}$" refers to the data voltage of the data signal DATA2 and the term "$|V_{TH\_TS2}|$" refers to an absolute value of the threshold voltage the switching transistor TS2. In some embodiments of the present disclosure, the term "V2" is used to refer to the reference voltage terminal V2 or the voltage of the reference voltage terminal V2, and the term "V3" is used to refer to the reference voltage terminal V3 or the voltage of the reference voltage terminal V3.

As shown in FIG. 4C, in the stabilization period $P_{STA}$, the multi-emission control signal mEM at the high logic level is applied to the gate terminal of the transistor T6 to turn on the transistor T6, thereby using the data voltage of the data signal DATA1 to stabilizing the voltage at the second terminal of the capacitor C1. In some embodiments, the multi-emission control signal mEM at the high logic level is applied to the gate terminals of the transistors T4~T5 in the stabilization period $P_{STA}$, in order to close paths through which currents flow from the reference voltage terminal V2 to the second terminal of the capacitor C2 and the second terminal of the capacitor C3, thereby stabilizing the voltages at the second terminals of the capacitors C2 and C3. In some embodiments, in the stabilization period $P_{STA}$, the control signal S1[n] at the high logic level is applied to the gate terminal of the transistor T1 to turn on the transistor T1, as such the voltage of the reference voltage terminal V2 is transmitted through the transistors T4 and T1 to the first terminal of the switching transistor TS2, in order to stabilizing the voltage at the first terminal of the switching transistor TS2.

In the stabilization period $P_{STA}$, the control signal S1[n] at the high logic level is applied to the gate terminals of the transistors T2 and T10~T13 to turn off the transistors T2 and T10~T13. The control signal S1[n−1] at the high logic level is applied to the transistors T7~T9 to turn off the transistor T7~T9. And, the multi-emission control signal mEM at the high logic level is applied to the transistors T14~T16 to turn off the transistors T14~T16.

In some embodiments, voltages at the nodes $N_A$~$N_F$ in the stabilization period $P_{STA}$ are similar with or the same as the voltage at the nodes $N_A$~$N_F$ at the end of the compensation period $P_{COM}$, and the description is omitted here.

For illustrating the operation of the driving circuit 100 at the beginning of the emission period $P_{EM}$, a description is provided with reference to FIG. 4D. As shown in FIG. 4A, by applying the multi-emission control signal mEM at the low logic level to the gate terminals of the transistors T15~T16, a current path from the second terminal of the switching transistor TS2 to the reference voltage terminal V1 and a current path from the second terminal of the driving transistor TD to the driving voltage terminal VSS are closed. And, in the emission period $P_{EM}$, by applying the control signal S1[n] at the high logic level to the gate terminal of the transistor T1, in order to close a current path between the second terminal of the capacitor C2 and the first terminal of the switching transistor TS2.

In the emission period $P_{EM}$, by applying the multi-emission control signal mEM at the low logic level to the gate terminals of the transistors T4~T6 to turn off the transistors T4~T6. By applying the control signal S1[n] at the high logic level to the gate terminals of the transistors T2 and T10~T13 to turn off the transistors T2 and T10~T13. By applying the control signal S1[n−1] at the high logic level to the gate terminals of the transistor T7~T9 to turn off the transistors T7~T9.

In the emission period $P_{EM}$, the multi-emission control signal mEM at the low logic level is applied to the gate terminal of the transistor T14 to close a path through which the second terminal of the capacitor C3 to the sweep signal line SWPL, as such the sweep signal $V_{SWEEP}$ is transmitted through the transistor T14 to the second terminal of the capacitor C3. At the beginning of the emission period $P_{EM}$, the voltage at the second terminal of the capacitor C3 is pulled low from the voltage of the reference voltage terminal V2 to the initial voltage of the sweep signal $V_{SWEEP}$, and the capacitor C3 pulls low the voltage at the gate terminal of the switching transistor TS2 by the coupling effect. And then, the voltage of the sweep signal $V_{SWEEP}$ is linearly increased in the emission period $P_{EM}$, as such the capacitor C3 gradually pulls up the voltage at the gate terminal of the switching transistor TS2 by coupling effect.

A period when the switching transistor TS2 is turned off in the emission period $P_{EM}$, a voltage at the node $N_B$ is substantially equal to the data voltage of the data signal DATA1. A voltage at the node $N_E$ is substantially equal to the voltage of the sweep signal $V_{SWEEP}$. A voltage at the node $N_F$ is substantially equal to the voltage of the reference voltage terminal V2. In some embodiments, the voltages at the node $N_A$ and nodes $N_C$~$N_D$ in the emission period $P_{EM}$ are given by the following functions.

$$V_{NA} = V3 - |V_{TH\_TD}|$$

$$V_{NC} = V2 - |V_{TH\_T3}|$$

$$V_{ND} = V_{SWEEP} - V2 + V_{DATA2} + V_{TH\_TS2}$$

In above functions, the term "$V_{NA}$" refers to a voltage at the node $N_A$. The term "$V_{NC}$" refers to a voltage at the node $N_C$. The term "VND" refers to a voltage at the node $N_D$. The term "$V_{DATA2}$" refers to a data voltage of the data signal DATA2. The term "$V_{TH\_TD}$" refers to the threshold voltage of the driving transistor TD. The term "$V_{TH\_T3}$" refers to the threshold voltage of the transistor T3. The term "$V_{TH\_TS2}$" refers to the threshold voltage of the switching transistor TS2. In some embodiments, the term "$V_{SWEEP}$" is used to refer to the voltage of the sweep signal $V_{SWEEP}$.

To be noted that, the voltage at the gate terminal of the switching transistor TS1 (the voltage at the node $N_C$) includes the factor of the threshold voltage of the transistor T3. Therefore, by performing the matching compensation to the switching transistor TS1 based on the threshold voltage of the transistor T3, as such the effect of the variation of the threshold voltage of the switching transistor TS1 on the rise edge of the diving current can be improved, in order to reduce the area under a curve of the driving current, thereby increasing the grayscale control accuracy.

In the emission period $P_{EM}$, a voltage across the gate terminal of the switching transistor TS2 (the node $N_D$) and the second terminal of the switching transistor TS2 (the source terminal of the switching transistor TS2) is given by the following function.

$$V_{GS\_TS2} = (V_{SWEEP} - V2 + V_{DATA2} + V_{TH\_TS2}) - V1$$

In above function, the term "$V_{GS\_TS2}$" refers to the voltage across the gate terminal and the source terminal of the switching transistor TS2. In some embodiments, when the voltage across the gate terminal and the source terminal of the switching transistor TS2 is greater than the threshold voltage of the switching transistor TS2, the switching transistor TS2 is turned on, and the case can be given by the following conditional expression.

$$(V_{SWEEP} - V2 + V_{DATA2} + V_{TH\_TS2}) - V1 > V_{TH\_TS2}$$

The following function can be derived from the above expression.

$$V_{SWEEP} > V2 - V_{DATA2} + V1$$

Specifically, when a voltage variation of the sweep signal $V_{SWEEP}$ is greater than the a value of subtracting the data voltage of the data signal DATA2 from the sum the voltages of the reference voltage terminals V2 and V1, the switching transistor TS2 is turned on. As a result, a point in time to turn on the switching transistor TS2 can be controlled by the setting of the data voltage of data signal DATA2. In some embodiments, since the voltage of the sweep signal $V_{SWEEP}$ is linearly increased in the emission period $P_{EM}$, it take less time to achieve to the said conditional expression if the data voltage is greater, as such the point in time to turn on the switching transistor TS2 is earlier, and the pulse width of the driving current is greater. On the other hand, it take more time to achieve to the said conditional expression if the data voltage is smaller, as such the point in time to turn on the switching transistor TS2 is later, and the pulse width of the driving current is smaller. As a result, the driving circuit 100 controls grayscale intensity by performing pulse width modulation.

A description is provided with reference to FIG. 4E for illustrating an operation during a period when the switching transistor TS2 being turned on in the emission period $P_{EM}$. As shown in FIG. 4E, when the switching transistor TS2 is turned on, the voltage of the reference voltage terminal V1 is transmitted through the transistor T15, the switching transistor TS2 and the transistor T1 to the second terminal of the capacitor C2, in order to change a voltage at the second terminal of the capacitor C2, thereby changing a voltage at the gate terminal of the switching transistor TS1 by coupling effect of the capacitor C2, as such the switching transistor TS1 is turned on. When the switching transistor TS1 is turned on, the voltage of the driving voltage terminal VDD is transmitted through the light emitting element L1 and the switching transistor TS1 to the second terminal of the capacitor C1, in order to change a voltage at the second terminal of the capacitor C1, thereby changing a voltage at the gate terminal of the driving transistor TD by coupling effect of the capacitor C1, as such the driving transistor TD is turned on.

As a result, by the capacitive coupling effect of the capacitor C1, the voltage variation at the node $N_B$ is transmitted to the gate terminal of the driving transistor TD. In a period when the switching transistor TS2 is turned on in the emission period $P_{EM}$, a voltage at the node $N_B$ is substantially equal to a difference between the voltage of the driving voltage terminal VDD and a voltage drop of the light emitting element L1. A voltage at the node $N_C$ is substantially equal to a sum of the voltage of the reference voltage terminal V1 and the threshold voltage of the transistor T3. A voltage at the node $N_E$ is substantially equal to a voltage of the sweep signal $V_{SWEEP}$. A voltage at the node $N_F$ is substantially equal to the voltage of the reference voltage terminal V1. In some embodiments, a voltage across the gate terminal (the node $N_A$) and the source terminal of the driving transistor TD (in this operation, the voltage at the said source terminal can be considered as the voltage at the node $N_B$) can be given by the following functions.

$$V_{NA} = (VDD - V_{LED}) - V_{DATA1} + (V3 - |V_{TH\_TD}|)$$

$$V_{NB} = (VDD - V_{LED})$$

In above functions, the term "VDD" refers to the voltage of the driving voltage terminal VDD, and the term "$V_{LED}$" refers to a voltage drop of the light emitting element L1.

Thus, based on the voltage across the source terminal (the node $N_B$) and the gate terminal (the node $N_A$) of the driving transistor TD, the function of the driving current is given by the following functions.

$$I_{LED} = K[(V_{NB} - V_{NA}) - |V_{TH\_TD}|]^2$$

-continued $$I_{LED}=K[V_{DATA1}-V3]^2$$

In above functions, the term "$I_{LED}$" refers to amplitude of the driving current, and the term "K" refers to a coefficient related to the characteristic of the driving transistor TD. It can be seen that, the threshold voltage of the driving transistor TD has been removed from the factors which affect the amplitude of the driving current, thereby compensating the threshold voltage of the driving transistor TD. And, the voltage of the driving voltage terminal VDD is also removed from the factors which affect the amplitude of the driving current, thereby compensating the voltage drop of the driving voltage terminal VDD, in order to improve the uniformity of the driving currents generated by the driving circuits in the entire panel. In some embodiments, since the driving current generated by the driving circuit 100 is less influenced by the voltage drop of the driving voltage terminal VDD, the driving circuit 100 can be applied in the micro light emitting diode splicing display, the said splicing display can be composed of multiple display panels configured in a matrix, and the compensation operation for the voltage drop of the driving voltage terminal VDD can improve the uniformity of the driving currents in the entire panel.

As shown in FIG. 4F, in the second and the following stabilization periods, the multi-emission control signal mEM at the high logic level is applied to the gate terminals of the transistors T4~T5, as such the transistors T4~T5 close paths through currents flowing from the reference voltage terminal V2 to the capacitors C2 and C3, in order to restore voltages at the gate terminals of the switching transistors TS1 and TS2 to the voltages after the compensation operation by coupling effect. And, the multi-emission control signal mEM at the high logic level is applied to the gate terminal of the transistor T6, in order to transmit the data voltage of the data signal DATA1 through the transistor T6 to the second terminal of the capacitor C1, thereby restoring voltages at the gate terminal of the driving transistor TD to the voltage after the compensation operation by coupling effect of the capacitor C1.

To be noted that, based on the configuration of the capacitor C1, the factor for compensating the threshold voltage of the driving transistor TD can be avoided being cleared in each of multiple emission operations $P_{EM}$. Based on the configuration of the capacitor C2, the factor of matching compensation of the switching transistor TS1 can be avoided being cleared in each of multiple emission operations $P_{EM}$. Based on the configuration of the capacitor C3, the factor for compensating the threshold voltage of the switching transistor TS2 and the factor of the data signal DATA2 can be avoided being cleared in each of multiple emission operations $P_{EM}$. Therefore, in each emission period $P_{EM}$ after performing reset and compensation operations once, the driving circuit 100 is capable to maintain the factors of the compensation of the threshold voltage of the driving transistor TD, the matching compensation of the switching transistor TS1, the compensation of the threshold voltage of the switching transistor TS2 and the voltage of the data signal DATA2.

In some embodiments, the operation of the driving circuit 100 in the off period $P_{OFF}$ is similar with the operation of the driving circuit 100 in the stabilization period $P_{STA}$. In some embodiments, voltages at the nodes $N_A$~$N_E$ included in the driving circuit 100 in the off period $P_{OFF}$ are respectively similar with or equal to voltages at the nodes $N_A$~$N_E$ included in the driving circuit 100 in the stabilization period $P_{STA}$, and the description is omitted here.

A description is provided with reference to FIG. 2 and FIG. 5A to FIG. 5D. FIG. 5A to FIG. 5D respectively depict schematic diagrams of driving currents $I_{GL255}$, $I_{GL127}$, $I_{GL32}$, a sweep signal $V_{SWEEP}$ and a multi-emission control signal EM of a driving circuit 100 in multi-emission periods according to an embodiment of the present disclosure.

Figures 5A, 5B, 5C, 5D:
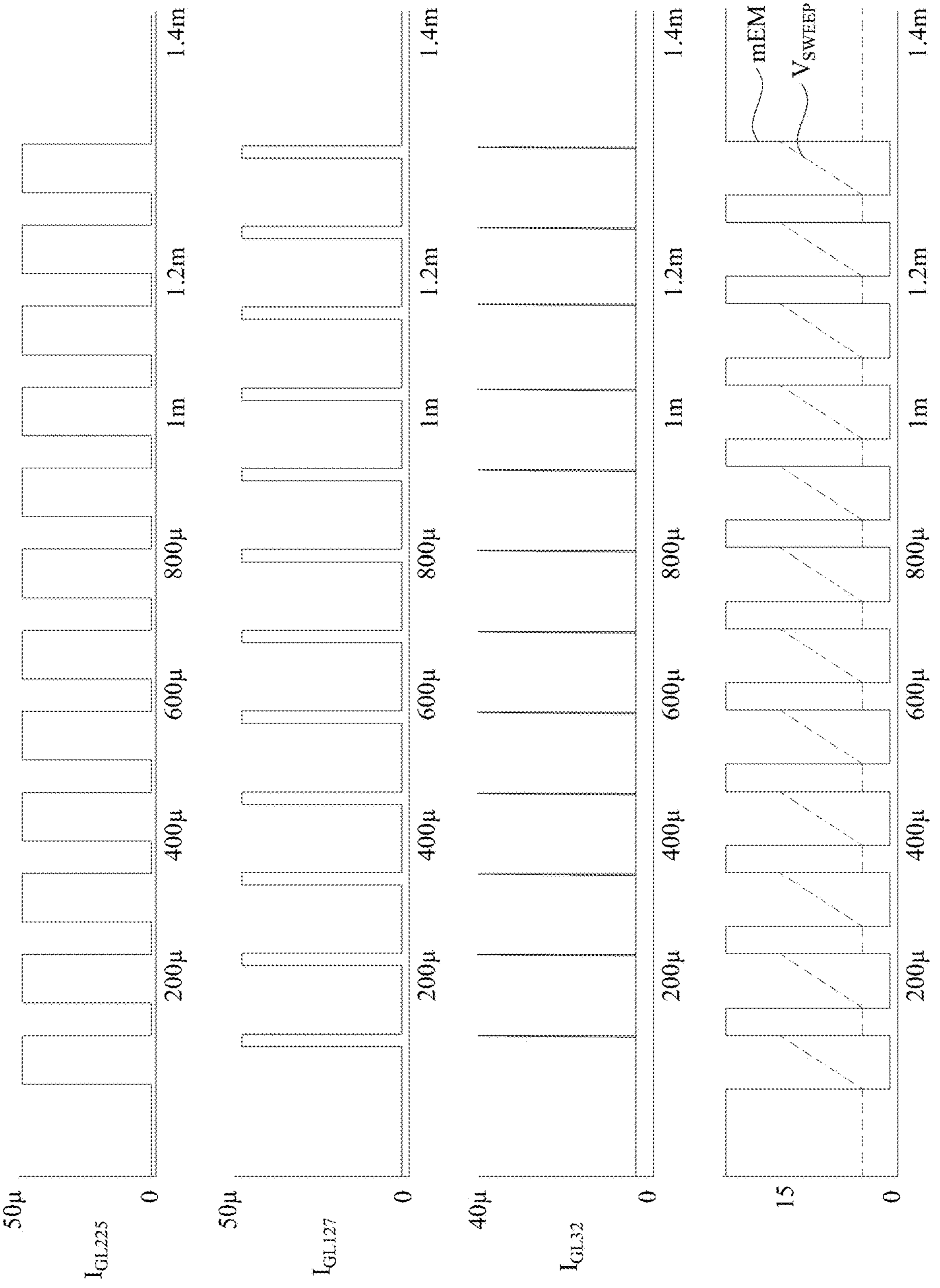
FIG. 5A to FIG. 5D respectively depict schematic diagrams of a driving current, a sweep signal and a multi-emission control signal of a driving circuit in multi-emission periods according to an embodiment of the present disclosure.

As shown in FIG. 5D, one display cycle of the driving circuit 100 includes multiple emission periods, the said emission periods correspond to periods when the multi-emission control signal mEM is at the low logic level. In some embodiments, the voltage of the sweep signal $V_{SWEEP}$ is linearly increased, and the voltage of the sweep signal $V_{SWEEP}$ is returned to an initial voltage at the end of each emission period.

As shown in FIG. 5A to FIG. 5C, when the data voltage of the data signal DATA2 are respectively set according to grayscales of 255, 127 and 32, the driving circuit 100 respectively generates the driving currents $I_{GL255}$, $I_{GL127}$ and $I_{GL32}$ to drive the light emitting element L1. In some embodiments, the points in time of the fall edges of the driving currents $I_{GL255}$, $I_{GL127}$ and $I_{GL32}$ correspond to the points in time of the fall edge of the multi-emission control signal mEM, and the points in time of the rise edges of the driving currents $I_{GL255}$, $I_{GL127}$ and $I_{GL32}$ depend on the data voltages of the data signal DATA2, as such rise edges of the driving currents $I_{GL255}$, $I_{GL127}$ and $I_{GL32}$ are occur in different points in time in each emission period. As a result, the driving currents $I_{GL255}$, $I_{GL127}$, $I_{GL32}$ have the different pulse widths, thereby implementing grayscale dimming by the pulse width modulation.

The compensation effect for the threshold voltage of the driving transistor TD and the voltage drop of the driving voltage terminal VDD is provided with the following Table 1.

TABLE 1

| $\Delta V_{TH\_TD}$ (V) | $\Delta V_{DD}$ (V) | $I_{LED}$ (μA) | error (%) |
|---|---|---|---|
| +0.3 | −0.5 | 48.949 | 0.96 |
| 0 | 0 | 49.423 | 0 |
| −0.3 | −0.5 | 48.796 | 1.27 |

As shown in FIG. 1, the term "$\Delta V_{TH\_TD}$" refers to the variation of the threshold voltage of the driving transistor TD. The term "$\Delta V_{DD}$" refers to the voltage drop of the driving voltage terminal VDD of the driving circuit 100. The term "$I_{LED}$" refers to the amplitude of the driving current generated by the driving circuit 100. In some embodiments, under a condition that the voltage drop of the driving voltage terminal VDD is −0.5 volts and the variation of the threshold voltage of the driving transistor TD is +0.3 volts, an error between an amplitude of the driving current thereof (such as, 48.949 μA) and an amplitude of the normal driving current (such as, 49.423 μA) is 0.96%. In some embodiments, under a condition that the voltage drop of the driving voltage terminal VDD is −0.5 volts and the variation of the threshold voltage of the driving transistor TD is −0.3 volts, an error between an amplitude of the driving current thereof (such as, 48.796 PA) and an amplitude of the normal driving current (such as, 49.423 PA) is 1.27%. It can be seen that, when the variation of the threshold voltage of the driving transistor TD is in a range of +0.3 volts to −0.3 volts and the voltage drop of the driving voltage terminal VDD is −0.5 volts, the error between the amplitude of the driving current can be reduced to below 1.3%. In other words, the structure and operation manner of the driving circuit 100 can effectively compensate the variation of the threshold voltage of the driving transistor TD and the voltage drop of the driving voltage terminal VDD.

Figure 6:
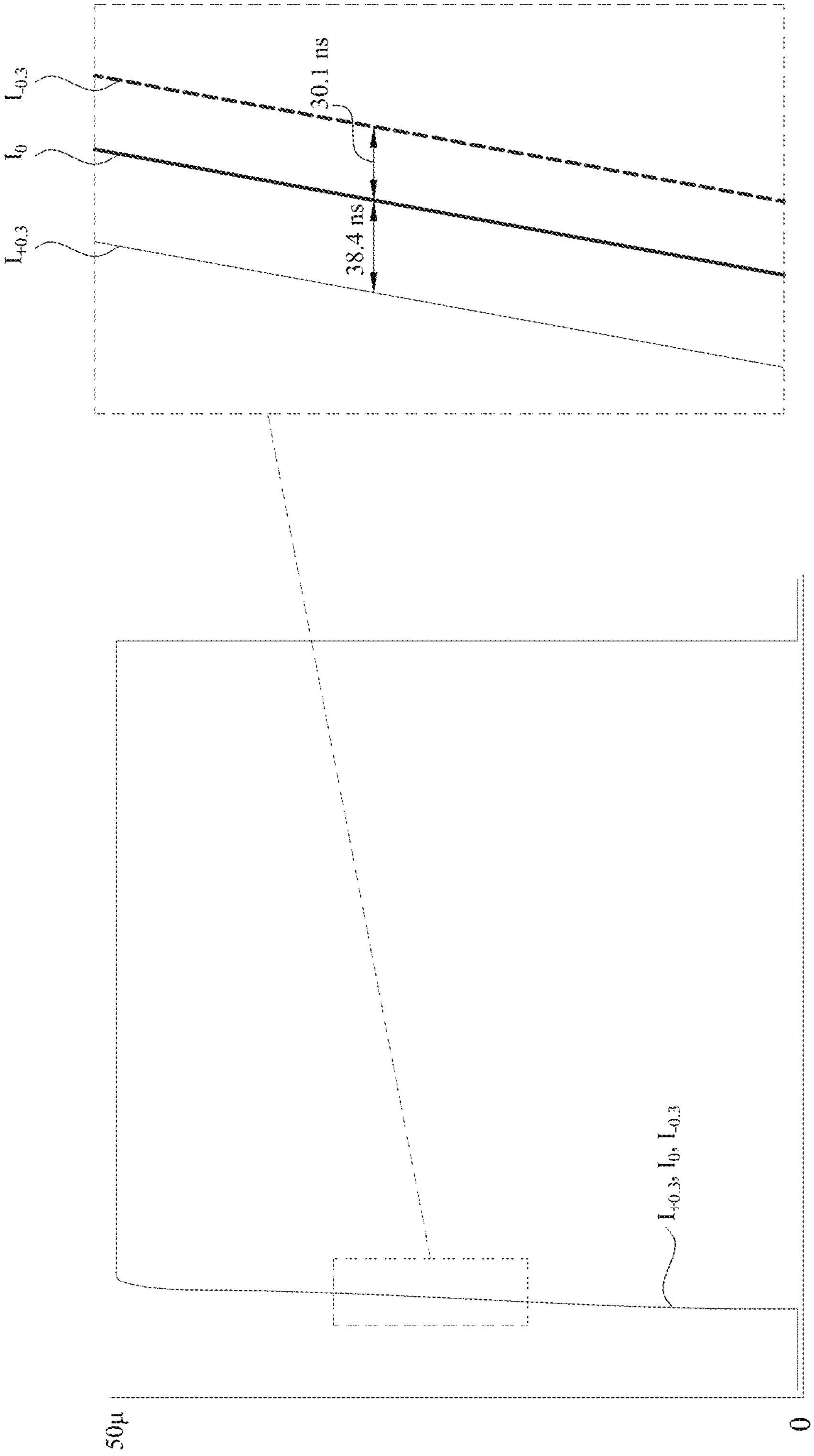
FIG. 6 depicts a schematic diagram of driving currents provided by a driving circuit under a condition of a variation of the threshold voltage of the switching transistor according to an embodiment of the present disclosure.

A description is provided with reference to FIG. 6. FIG. 6 depicts a schematic diagram of driving currents provided by a driving circuit under a condition of a variation of the threshold voltage of the switching transistor TS2 according to an embodiment of the present disclosure. As shown in FIG. 6, in some embodiments, under a condition that the variation of the threshold voltage of the switching transistor TS2 is +0.3 volts, a rising edge of the driving current $I_{+0.3}$ thereof is 38.4 ns earlier than a rising edge of a normal driving current $I_0$. In some embodiments, under a condition that the variation of the threshold voltage of the switching transistor TS2 is −0.3 volts, a rising edge of the driving current $I_{-0.3}$ thereof is 30.1 ns later than a rising edge of a normal driving current $I_0$. As a result, from the embodiments of FIG. 6, it can be known that the driving circuit 100 is capable to compensate the variation of the threshold voltage of the switching transistor TS2, excellently.

Figure 7A:
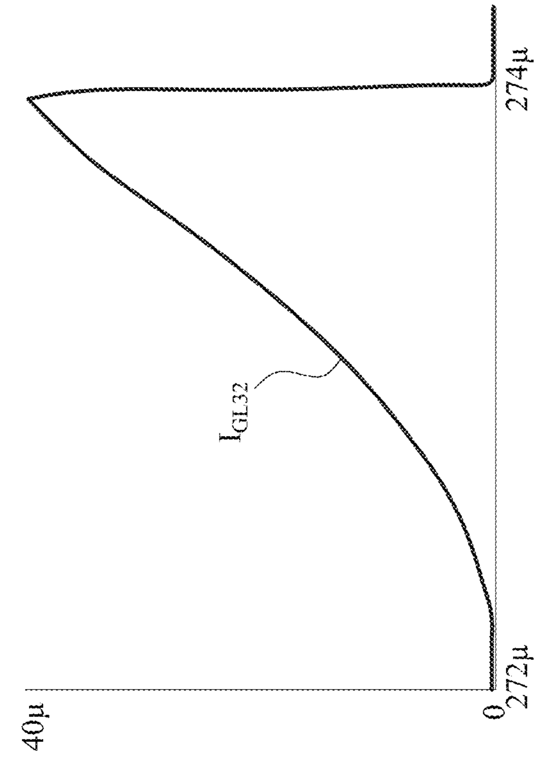
FIG. 7A to FIG. 7B respectively depicts schematic diagrams of a driving current in an emission period according to an embodiment of the present disclosure.
Figure 7B:
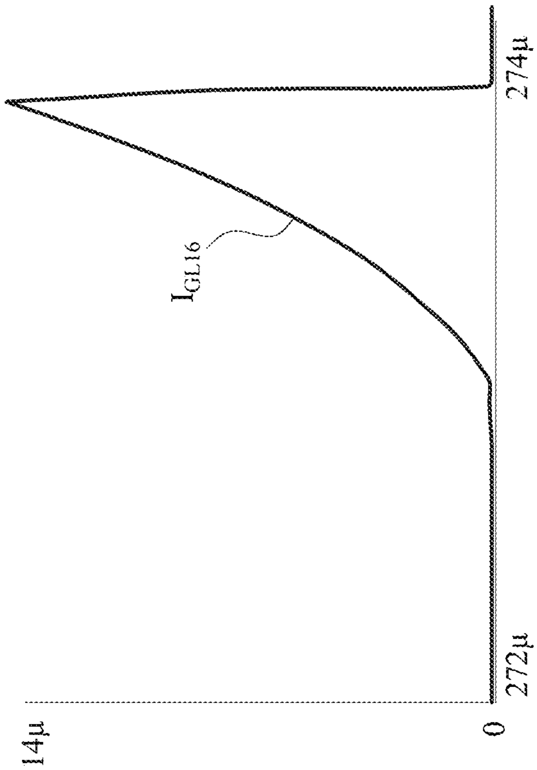

A description is provided with reference to FIGS. 7A and 7B. FIG. 7A to FIG. 7B respectively depicts schematic diagrams of driving currents $I_{GL16}$, $I_{GL16}$ in an emission period according to an embodiment of the present disclosure. In some embodiments, when the data voltage of the data signal DATA2 is set according to the grayscale of 32, the area under a curve of the driving current $I_{GL32}$ is $3.1815 \times 10^{-11}$ A·s. The matching compensation effect for the switching transistor TS1 under a condition of the variations of the threshold voltages of the switching transistor TS1, the transistor T3 and the transistor T1, when the data voltage of the data signal DATA2 is set according to the grayscale of 32, is provided with the following Table 2.

TABLE 2

| $\Delta V_{TH\_TS1}$ (V)/ $\Delta V_{TH\_T3}$ (V)/ $\Delta V_{TH\_T1}$ (V) | area under curve of driving current ($\times 10^{-11}$ A · s) | error (%) |
|---|---|---|
| +0.3/+0.3/+0.3 | 3.1525 | 0.91 |
| 0/0/0 | 3.1815 | 0 |
| −0.3/−0.3/−0.3 | 3.2109 | 0.92 |

As shown in Table 2, the term "$\Delta V_{TH\_TS1}$" refers to the variation of the threshold voltage of the switching transistor TS1. The term "$\Delta V_{TH\_T3}$" refers to the variation of the threshold voltage of the switching transistor TS3, and the term "$\Delta V_{TH\_T1}$" refers to the variation of the threshold voltage of the transistor T1. In some embodiments, when the data voltage of the data signal DATA2 is set according to the grayscale of 32 and the variations of the threshold voltages of the transistors T1 and T3 are +0.3, an area under a curve of the driving current thereof is $3.1525 \times 10^{-11}$ A·s, and an error between the area under the curve of the driving current thereof and an area (such as, $3.1815 \times 10^{-11}$ A·s) under a curve of a normal driving current is 0.91%. In some embodiments, when the data voltage of the data signal DATA2 is set according to the grayscale of 16 and the variations of the threshold voltages of the transistors T1 and T3 are −0.3, an area under a curve of the driving current thereof is $3.2109 \times 10^{-11}$ A·s, and an error between the area under the curve of the driving current thereof and an area (such as, $3.1815 \times 10^{-11}$ A·s) under a curve of a normal driving current is 0.92%. It can be seen that, under the condition of grayscale of 32, when the variations of the threshold voltages of the switching transistor TS1, the transistors T1 and T3 are in a range of +0.3 volts to −0.3 volts, the error of the area under the curve of the driving current can be reduced to below 1%. In other words, the structure and the operation manner of the driving circuit 100 can utilizes the transistor T3 to effectively compensate the variation of the threshold voltage of the switching transistor TS1, in order to the waveform of the driving current at the low grayscale.

In some embodiments, when the data voltage of the data signal DATA2 is set according to the grayscale of 16, an area under the curve of the driving current $I_{GL16}$ is $6.7781 \times 10^{-12}$ A·s. The matching compensation effect for the switching transistor TS1 when the data voltage of the data signal DATA2 is set according to the grayscale of 16 under a condition of variations of the threshold voltages of the switching transistor TS1, the transistor T3 and the transistor T1 is provided with the following Table 3.

TABLE 3

| $\Delta V_{TH\_TS1}$ (V)/ $\Delta V_{TH\_T3}$ (V)/ $AV_{TH\_T1}$ (V) | area under curve of driving current ($\times 10^{-12}$ A · s) | error (%) |
|---|---|---|
| +0.3/+0.3/+0.3 | 6.6584 | 1.76 |
| 0/0/0 | 6.7781 | 0 |
| −0.3/−0.3/−0.3 | 6.9077 | 0.91 |

As shown in Table 3, in some embodiments, when the data voltage of the data signal DATA2 is set according to the grayscale of 16 and the variations of the threshold voltages of the transistors T1 and T3 are +0.3 volts, the area under the curve of the driving current thereof is $6.6584 \times 10^{-12}$ A·s, and an error between the area under the curve of the driving current thereof and an area (such as, $6.7781 \times 10^{-12}$ A·s) under a curve of a normal driving current is 1.76%. In some embodiments, when the data voltage of the data signal DATA2 is set according to the grayscale of 16 and the variations of the threshold voltages of the transistors T1 and T3 are −0.3 volts, the area under the curve of the driving current thereof is $6.9077 \times 10^{-12}$ A·s, and an error between the area under the curve of the driving current thereof and an area (such as, $3.1815 \times 10^{-12}$ A·s) under a curve of a normal driving current is 0.91%. It can be seen that, under a condition of the grayscale of 16, when the variations of the threshold voltages of the switching transistor TS1, the transistors T1 and T3 are in a range of +0.3 volts to −0.3 volts, the error of the area under a curve of the driving current can be reduced to below 2%. In other words, the structure and the operation manner of the driving circuit 100 can utilizes the transistor T3 to effectively compensate the variation of the threshold voltage of the switching transistor TS1, in order to the waveform of the driving current at the low grayscale.

Figure 8A:
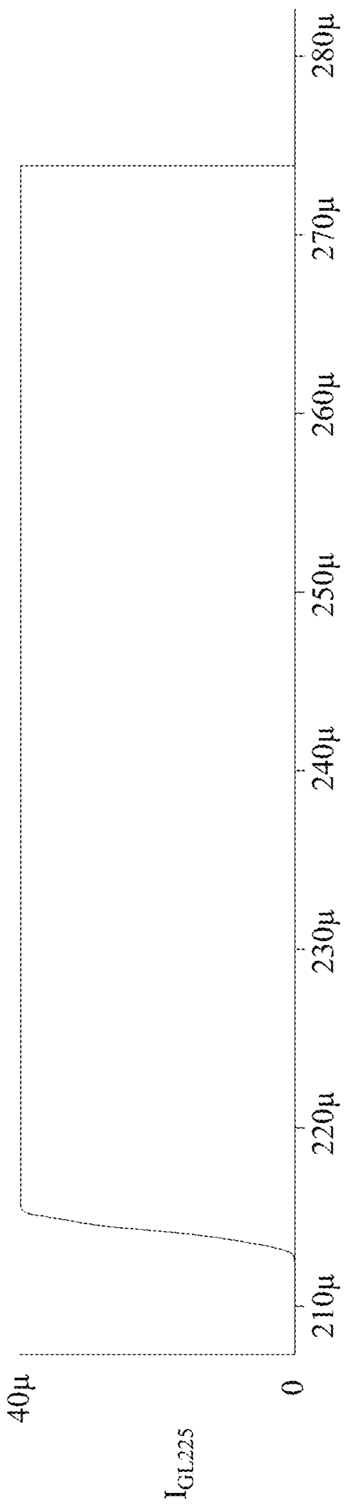
FIG. 8A to FIG. 8C respectively depicts a schematic diagram of a driving current provided by a driving circuit in an emission period according to an embodiment of the present disclosure.
Figure 8B:
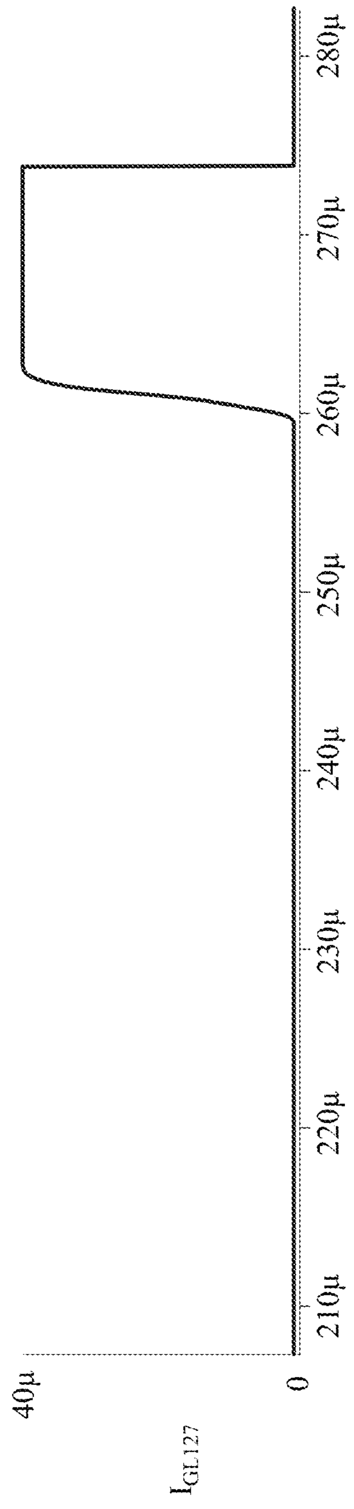
Figure 8C:
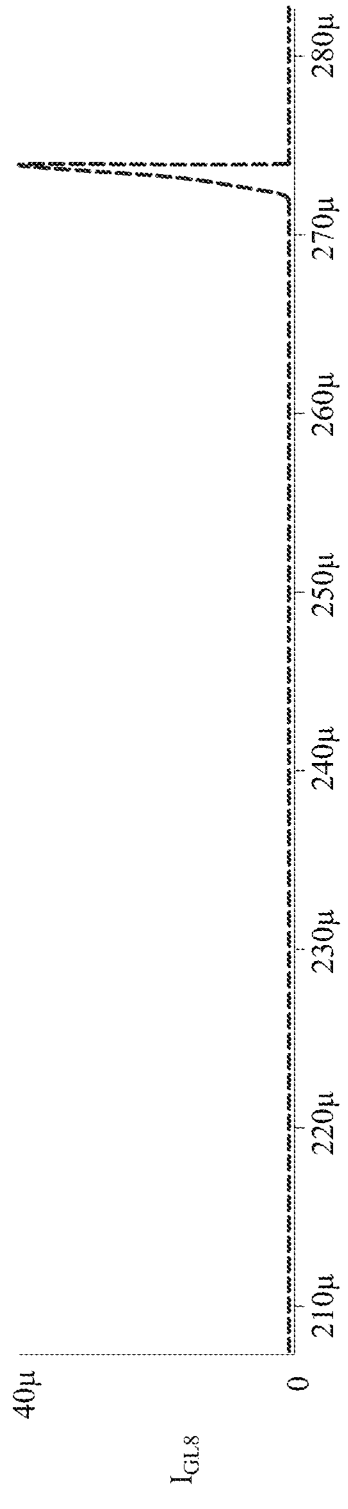

A description is provided with reference to FIG. 8A to FIG. 8C. FIG. 8A to FIG. 8C respectively depicts a schematic diagram of driving currents $I_{GL255}$, $I_{GL127}$ and $I_{GL8}$ in an emission period provided by a driving circuit 100 according to an embodiment of the present disclosure. In some embodiments, when the data voltage of the data signal DATA2 (such as, 10.2 volts) is set according to the grayscale of 255, the rise time of the driving current $I_{GL255}$ is 1.55 μs. In some embodiments, when the data voltage of the data signal DATA2 (such as, 3.2 volts) is set according to the grayscale of 127, the rise time of the driving current $I_{GL127}$ is 1.56 μs. When the data voltage of the data signal DATA2 (such as, 1.445 volts) is set according to the grayscale of 8, the rise time of the driving current $I_{GL8}$ is 0.662 μs. From the embodiments of FIG. 8A to FIG. 8C, it can be seen that, the driving circuit 100 can substantially improve the rise time of the driving current, thereby accurately controlling the grayscale better, as such the light emitting element L1 can operate at the best luminous efficiency point at overall grayscale.

Summary, the driving circuit 100 of the present disclosure utilizes the coupling effect of the capacitor C2 to turn on the switching transistor TS1, it can avoid clearing the factor of matching compensation for the switching transistor TS1 in the emission operation, thereby substantially reducing the error of the area under the curve of the driving current, in order to improve the accuracy for the grayscale control. The driving circuit 100 of the present disclosure is capable to compensate the voltage drop of the driving voltage terminal VDD, as such the driving circuit 100 can be applied in splicing screen, in order to improve the overall uniformity. The driving circuit 100 of the present disclosure can effectively compensate the variations of the threshold voltages of the driving transistor TD, the switching transistor TS1 and the switching transistor TS2, thereby improving the uniformity of driving currents.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving circuit, comprising:
- a driving transistor, electrically connected between a first driving voltage terminal and a second driving voltage terminal, and the driving transistor is configured to control a driving current provided to a light emitting element;
- a first capacitor, with a first terminal electrically connected to a gate terminal of the driving transistor;
- a first switching transistor, with a first terminal electrically connected to a first terminal of the driving transistor, with a second terminal electrically connected to a second terminal of the first capacitor;
- a second capacitor, with a first terminal electrically connected to a gate terminal of the first switching transistor;
- a second switching transistor, with a first terminal electrically connected between a second terminal of the second capacitor and a first reference voltage terminal; and
- a third capacitor, electrically connected between a gate terminal of the second switching transistor and a sweep signal line.

2. The driving circuit of claim 1, wherein the second switching transistor is configured to close a path through which a current flows from the second terminal of the second capacitor to the first reference voltage terminal according to a voltage variation of a sweep signal at the sweep signal line, as such the second capacitor changes a voltage at the gate terminal of the first switching transistor by capacitive coupling effect, thereby turning on the first switching transistor.

3. The driving circuit of claim 1, wherein the first switching transistor is configured to close a path through which a current flows from the first driving voltage terminal to the second terminal of the first capacitor according to a voltage at the first terminal of the second capacitor, as such the first capacitor changes a voltage at the gate terminal of the driving transistor by capacitive coupling effect, thereby turning on the driving transistor.

4. The driving circuit of claim 1, further comprising:
- a first transistor, with a first terminal electrically connected to the second terminal of the second capacitor, with a second terminal electrically connected to the first terminal of the second switching transistor, with a gate terminal configured to receive a first control signal; and
- a first compensation circuit, electrically connected to the gate terminal of the first switching transistor, and the first compensation circuit is configured to compensate a threshold voltage of the first switching transistor.

5. The driving circuit of claim 4, wherein the first compensation circuit comprises:
- a second transistor, with a first terminal electrically connected to the gate terminal of the first switching transistor, with a gate terminal configured to receive the first control signal; and
- a third transistor, with a first terminal and a gate terminal electrically connected to a second terminal of the second transistor, with a second terminal electrically connected to a second reference voltage terminal.

6. The driving circuit of claim 1, further comprising:
- a first stabilization circuit, electrically connected to the second terminal of the second capacitor, and the first stabilization circuit is configured to stabilize a voltage at the second terminal of the second capacitor, wherein the first stabilization circuit comprises:
  - a fourth transistor, with a first terminal electrically connected to the second terminal of the second capacitor, with a second terminal electrically connected to a second reference voltage terminal, with a gate terminal configured to receive a multi-emission control signal; and
- a second stabilization circuit, electrically connected to a second terminal of the third capacitor, and the second stabilization circuit is configured to stabilize a voltage at the second terminal of the third capacitor, wherein a first terminal of the third capacitor is electrically connected to the gate terminal of the second switching transistor, wherein the second stabilization circuit comprises:
  - a fifth transistor, with a first terminal electrically connected to the second terminal of the third capacitor, with a second terminal electrically connected to the second reference voltage terminal, with a gate terminal configured to receive the multi-emission control signal.

7. The driving circuit of claim 1, further comprising:
- a data setting circuit, electrically connected to the second terminal of the first capacitor, and the data setting circuit is configured to transmit a first data voltage of a first data signal to the second terminal of the first capacitor, wherein the data setting circuit comprises:
  - a sixth transistor, with a first terminal electrically connected to the second terminal of the first capacitor, with a second terminal configured to receive the first data signal, with a gate terminal configured to receive a multi-emission control signal.

8. The driving circuit of claim 1, further comprising:
- a first reset circuit, electrically connected to the gate terminal of the first switching transistor, and the first reset circuit is configured to reset a voltage at the gate terminal of the first switching transistor, wherein the first reset circuit comprises:
  - a seventh transistor, with a first terminal electrically connected to the gate terminal of the first switching transistor, with a second terminal electrically connected to the first reference voltage terminal, with a gate terminal configured to receive a second control signal;

a second reset circuit, electrically connected to the gate terminal of the driving transistor, and the second reset circuit is configured to reset a voltage at the gate terminal of the driving transistor, wherein the second reset circuit comprises:

an eighth transistor, with a first terminal electrically connected to the gate terminal of the driving transistor, with a second terminal electrically connected to the first reference voltage terminal, with a gate terminal configured to receive the second control signal; and a third reset circuit, to the gate terminal of the second switching transistor, and the third reset circuit is configured to reset a voltage at the gate terminal of the second switching transistor, wherein the third reset circuit comprises:

a ninth transistor, with a first terminal electrically connected to the gate terminal of the second switching transistor, with a second terminal electrically connected to a second reference voltage terminal, with a gate terminal configured to receive the second control signal.

9. The driving circuit of claim 1, further comprising:

a first compensation circuit, electrically connected to the gate terminal of the driving transistor, and the first compensation circuit is configured to compensate a threshold voltage of the driving transistor, wherein the first compensation circuit comprises:

a tenth transistor, with a first terminal electrically connected to the first terminal of the driving transistor, with a second terminal electrically connected to a third reference voltage terminal, with a gate terminal configured to receive a first control signal; and an eleventh transistor, with a first terminal electrically connected to the second terminal of the driving transistor, with a second terminal electrically connected to the gate terminal of the driving transistor, with a gate terminal configured to receive the first control signal; and a second compensation circuit, electrically connected to the gate terminal of the second switching transistor, and the second compensation circuit is configured to compensate a threshold voltage of the second switching transistor, wherein the second compensation circuit comprises:

a twelfth transistor, with a first terminal electrically connected to the second terminal of the second switching transistor, with a second terminal configured to receive a second data signal, with a gate terminal configured to receive the first control signal; and a thirteen transistor, with a first terminal electrically connected to the first terminal of the second switching transistor, with a second terminal electrically connected to the gate terminal of the second switching transistor, with a gate terminal configured to the first control signal.

10. The driving circuit of claim 1, further comprising:

fourteen transistor, with a first terminal electrically connected to a second terminal of the third capacitor, with a second terminal configured to receive a sweep signal, with a gate terminal configured to receive a multi-emission control signal;

a fifteen transistor, with a first terminal electrically connected to the second terminal of the second switching transistor, with a second terminal electrically connected to the first reference voltage terminal, with a gate terminal configured to receive the multi-emission control signal;

a sixteen transistor, with a first terminal electrically connected to the second terminal of the driving transistor, with a second terminal electrically connected to the second driving voltage terminal, with a gate terminal configured to receive the multi-emission control signal;

a fourth capacitor, with a first terminal electrically connected to the second terminal of the first capacitor, with a second terminal electrically connected to the first reference voltage terminal; and a fifth capacitor, with a first terminal electrically connected to the second terminal of the second capacitor, with a second terminal electrically connected to the first reference voltage terminal.

11. A driving circuit, comprising:

a driving transistor, electrically connected between a first driving voltage terminal and a second driving voltage terminal, and the driving transistor is configured to control a driving current provided to a light emitting element;

a first capacitor and a first switching transistor electrically connected in series between the first driving voltage terminal and a gate terminal of the driving transistor; and a second capacitor, a first transistor and a second switching transistor electrically connected in series between a gate terminal of the first switching transistor and a first reference voltage terminal, and wherein a voltage at a gate terminal of the second switching transistor is varied according to a sweep signal in an emission period.

12. The driving circuit of claim 11, wherein the second switching transistor is configured to close a path through which a current flows from the second capacitor to the first reference voltage terminal according to a voltage variation of the sweep signal, as such the second capacitor changes a voltage at the gate terminal of the first switching transistor by capacitive coupling effect, thereby turning on the first switching transistor.

13. The driving circuit of claim 11, wherein the first switching transistor is configured to close a path through which a current flows from the first driving voltage terminal to the first capacitor according to a voltage at the gate terminal of the first switching transistor, as such the first capacitor changes a voltage at the gate terminal of the driving transistor by capacitive coupling effect, thereby turning on the driving transistor.

14. The driving circuit of claim 11, further comprising:

a first compensation circuit, electrically connected to the gate terminal of the first switching transistor, and the first compensation circuit is configured to perform matching compensation for a threshold voltage of the first switching transistor.

15. The driving circuit of claim 14, wherein the first compensation circuit comprises:

a second transistor, with a first terminal electrically connected to the gate terminal of the first switching transistor, with a gate terminal configured to receive a first control signal; and a third transistor, with a first terminal and a gate terminal electrically connected to a second terminal of the second transistor, with a second terminal electrically connected to a second reference voltage terminal.

16. The driving circuit of claim 11, wherein a first terminal of the second capacitor is electrically connected to the gate terminal of the first switching transistor, and wherein second terminal of the second capacitor is electrically connected to a first terminal of the first transistor.

17. The driving circuit of claim 16, further comprising:

a first stabilization circuit, electrically connected to the second terminal of the second capacitor, and the first stabilization circuit is configured to stabilize a voltage at the second terminal of the second capacitor.

18. The driving circuit of claim 17, wherein the first stabilization circuit comprises:

a fourth transistor, with a first terminal electrically connected to the second terminal of the second capacitor, with a second terminal electrically connected to a second reference voltage terminal, with a gate terminal configured to receive a multi-emission control signal.

19. The driving circuit of claim 11, further comprising:

a first reset circuit, electrically connected to the gate terminal of the first switching transistor, and the first reset circuit is configured to reset a voltage at the gate terminal of the first switching transistor.

20. A driving circuit, comprising:

a driving transistor, electrically connected between a first driving voltage terminal and a second driving voltage terminal, and the driving transistor is configured to control a driving current provided to a light emitting element;

a first capacitor and a first switching transistor electrically connected in series between the first driving voltage terminal and a gate terminal of the driving transistor;

a second capacitor and a second switching transistor electrically connected between a gate terminal of the first switching transistor and a first reference voltage terminal; and a third capacitor, electrically connected between a gate terminal of the second switching transistor and a sweep signal line.

* * * * *